(12) United States Patent
Pettey

(10) Patent No.: US 7,750,517 B2
(45) Date of Patent: *Jul. 6, 2010

(54) HOBBY SERVICE HAVING ENHANCED OPERATIONAL PERFORMANCE

(75) Inventor: Brian Pettey, Winfield, KS (US)

(73) Assignee: BTR Robotics Limited Liability Company, Winfield, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,536

(22) Filed: Feb. 10, 2009

(65) Prior Publication Data

US 2009/0140687 A1 Jun. 4, 2009

Related U.S. Application Data

(63) Continuation of application No. 11/153,800, filed on Jun. 15, 2005, now Pat. No. 7,559,129.

(60) Provisional application No. 60/584,288, filed on Jun. 30, 2004.

(51) Int. Cl.
*H02K 5/00* (2006.01)
*H02K 7/00* (2006.01)

(52) U.S. Cl. .................. 310/75 R; 310/68 B; 310/91; 414/744.5

(58) Field of Classification Search ............... 310/75 R, 310/91, 68 R, 68 B; 414/744.5
See application file for complete search history.

(56) References Cited

U.S. PATENT DOCUMENTS

| | | | |
|---|---|---|---|
| 3,423,656 A | 1/1969 | Tripp | 318/570 |
| 4,180,205 A | 12/1979 | Schwartz | 235/411 |
| 4,979,855 A | 12/1990 | Babel | 409/218 |
| 5,228,288 A | 7/1993 | Sollami | 60/368 |
| 5,762,439 A | 6/1998 | Siner | 406/359.6 |
| 6,579,031 B2 | 6/2003 | Bien | 406/359.1 |
| 7,285,884 B2 * | 10/2007 | Pettey | 310/75 R |
| 7,336,009 B2 * | 2/2008 | Pettey | 310/75 R |
| 7,501,731 B2 * | 3/2009 | Pettey | 310/75 R |
| 7,559,129 B2 * | 7/2009 | Pettey | 29/401.1 |
| 2009/0064818 A1 * | 3/2009 | Pettey | 74/640 |

OTHER PUBLICATIONS

Anderson, D.; "Improving Servo Positioning Accuracy," http://www.seattlerobotics.org/encoder/200010/servohac.html pp. 1-9.
Anderson, D.; "Improving Servo Positioning Accuracy," http://web.archive.org/web/*/http://www.geology.smu.edu/~dpa-www. pp. 1-8.
Wheat, D.; "Hacking the Tower Hobbies TS-53 Servo," DPRG: http://web.archive.org/web/20040623092815/dprg.org/projects/2003-05a/, May 9, 2003, pp. 1-7.
Brown, J.; "Sub Micro Servo Motor Hack," DPRG http://web.archive.org/web/20040622205626/dprg.org/projects/1998-04b/ Apr. 1998, pp. 1-11.
Anderson, D. "Improving Servo Positioning Accuracy," DPRG, http://www.dprg.org/projects/2000-09a/?, Sep. 19, 2000. pp. 1-5.

* cited by examiner

*Primary Examiner*—Tran N Nguyen
(74) *Attorney, Agent, or Firm*—Westman, Champlin & Kelly, P.A.

(57) ABSTRACT

An apparatus is disclosed for enhancing the operational performance of a servo. The apparatus comprises an auxiliary shaft that is independent and displaced from the servo and an actuation sensor that is operably coupled to the auxiliary shaft. The auxiliary shaft is configured to be driven by a motor associated with the servo.

20 Claims, 20 Drawing Sheets

HOBBY SERVICE HAVING ENHANCED OPERATIONAL PERFORMANCE

The present application is a continuation of, and is based on, and claims the benefit of U.S. patent application Ser. No. 11/153,800, filed on Jun. 15, 2005, the content of which is hereby incorporated by reference in its entirety, the latter application being based on U.S. provisional application 60/584,288, filed on Jun. 30, 2004.

BACKGROUND

The present invention generally pertains to the hobby-mechanical industry. More specifically, the present invention pertains to means for extending the torque and/or rotational capacity of a hobby servo.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servo motors that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

The output shaft of a hobby servo is typically capable of traveling approximately 180° (possibly up to 210° or more depending on manufacturer). Rotation of the hobby servo shaft is limited typically by one or more internal mechanical stops. It is also typically true that the output shaft of a hobby servo is capable of producing a relatively limited amount of torque power. The torque and rotational limitations of a hobby servo are adequate for many hobby applications, such as model car steering control, puppet control, robot arm or head movement and/or model airplane rudder control. It is true, however, that some applications require a servo having torque power and/or a rotational capacity that is beyond the capability of a typical hobby servo. Increased torque power and/or rotational capacity enable greater mechanical flexibility.

Some hobby servos can be mechanically altered to provide an extended range of rotation. However, this solution requires mechanical alteration that often only works for some types of servos. Rotational control for most hobby servos is limited by the internal potentiometer being utilized to monitor rotation. When a hobby servo is hacked to extend the rotational capacity, the internal potentiometer of the servo will, in most instances, not be configured to monitor angular positions too far beyond the original range of rotation. The control system of a hacked servo will commonly not be configured to accurately position the servo output shaft too far within the extended range of rotation. For this reason, it becomes difficult to control rotation once a hobby servo has been adapted for extended rotation.

SUMMARY

Embodiments of an independent and modular apparatus are disclosed for enhancing the operational performance of a servo motor. Embodiments include a frame member having a servo motor and a rotatable shaft mounted therein. The output shaft of the servo motor and the rotatable shaft are displaced from one another. Means are incorporated for translating rotational motion from the output shaft to the rotatable shaft so as to enable a torque or rotational capacity for the rotatable shaft that is greater than that of the servo output shaft. Further means are incorporated to enable proportional control of the rotatable shaft even when the output shaft of the servo is rotated beyond its intended range of rotation and/or torque.

DETAILED DESCRIPTION

Figure 1:
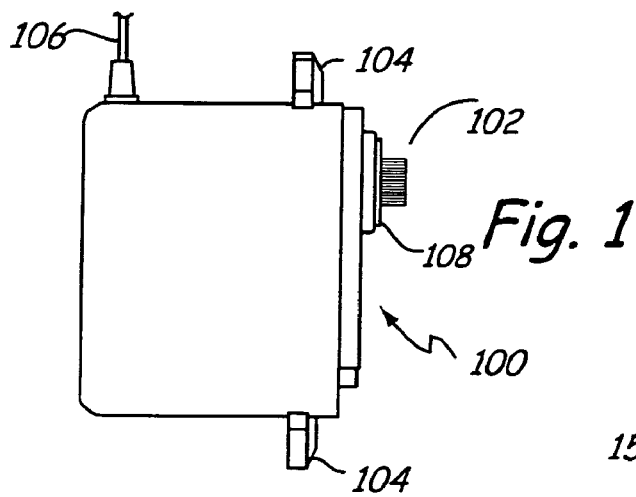
FIG. 1 is a side view of a hobby servo.

FIG. 1 is a side view of a hobby servo 100. Servo 100 includes attachment flanges 104. Flanges 104 typically include apertures formed therein for receiving an attachment mechanism (e.g., a screw, bolt, etc). The attachment mechanism is utilized to secure servo 100 within an operative environment. Servo 100 also includes an electrical connection 106 that enables the servo to receive electrical power and/or control signals.

Servo 100 includes a rotatable output shaft 102 also known as a servo spline. The servo output shaft 102 can be positioned to specific angular positions in accordance with a coded signal received by the servo. It is common that a particular angular position will be maintained as long as a corresponding coded signal exists on an input line. If the coded signal changes, the angular position of the servo output shaft 102 will change accordingly. Control circuits and a potentiometer are typically included within the illustrated outer housing of servo motor 100. The control circuits and potentiometer are functionally connected to the servo output shaft 102. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

Rotation of servo output shaft 102 is typically limited to around 180°. In most cases, rotation is limited at least because of an internal mechanical stop. It is also common that servo output shaft 102 is capable of producing a relatively limited amount of torque power. The torque and rotational limitations of a hobby servo are adequate for many applications; however, some applications require a servo having torque power and/or a rotational capacity that is beyond the capability of a typical hobby servo. Increased torque power and/or rotational capacity enable greater mechanical flexibility.

Figure 2:
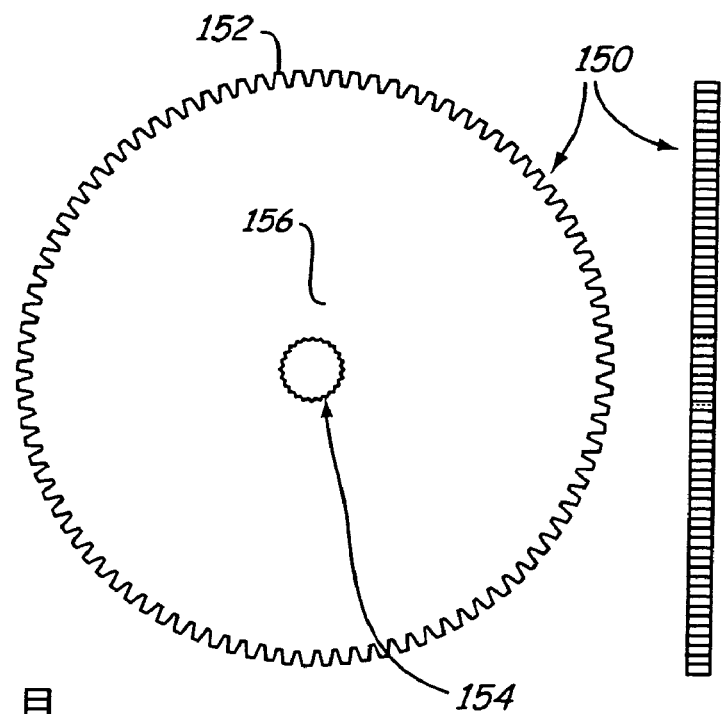
FIG. 2 is a side and front view of an enhancement gear.

FIG. 2, in accordance with one aspect of the present invention, is a side and front view of a servo enhancement gear 150. Servo gear 150 includes a plurality of gear teeth 152 disposed around an outer edge perimeter of gear 150. A female spline receiver 154 is formed through the approximate middle of the gear. Spline receiver 154 is, illustratively, an aperture having a series of teeth formed around the outer perimeter. The teeth formed within spline receiver 154 are illustratively configured to engage a corresponding set of teeth formed on servo spline 102. It is common for servo spline 102 to have a 23, 24 or 25 tooth configuration. In accordance with one aspect of the present invention, a different gear 150 can be utilized depending upon which spline receiver 154 configuration is needed to accommodate a given spline 102. In accordance with another embodiment, a specialized spline receiver 154 configuration for a gear 150 is configured to accommodate attachment to multiple spline 102 configurations. It should be noted that spline receiver 154 configurations other than those suitable for 23, 24 or 25 tooth configurations are within the scope of the present invention.

Figure 3:
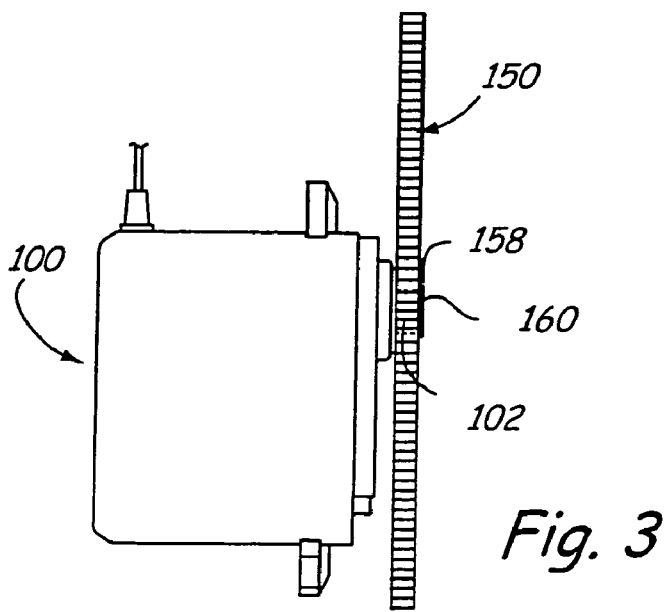
FIG. 3 is a side view of the enhancement gear after being engaged to the hobby servo.

FIG. 3, in accordance with one aspect of the present invention, is an illustration of a servo enhancement gear 150 that has been attached to a servo 100. Spline receiver 154 is engaged to spline 102. A washer 158 and a screw 160 are utilized to secure gear 150 to spline 102. In one embodiment, washer 158 has an overall diameter that is greater than spline receiver 154. Accordingly, the washer is centered on the outside face of gear 150 such that the aperture in the washer corresponds to an attachment aperture formed in spline 102. Screw 160 is then engaged into the attachment aperture in spline 102 until washer 158 tightens against gear 150 thereby locking gear 150 into a rotational engagement with spline 102. Of course, other attachment schemes are within the scope of the present invention.

In accordance with one aspect of the present invention, gear 150 is configured such that the surface around spline receiver 154 will engage a surface proximate spline 102 in a flush manner. For example, with reference to FIG. 1, servo 100 includes a relatively planar surface 108. Similarly, with reference to FIG. 2, gear 150 includes a relatively planar surface 156. As is shown in FIG. 3, when gear 150 is engaged to servo 100, surfaces 108 and 156 are engaged to one another in a relatively flush relationship.

Figure 4:
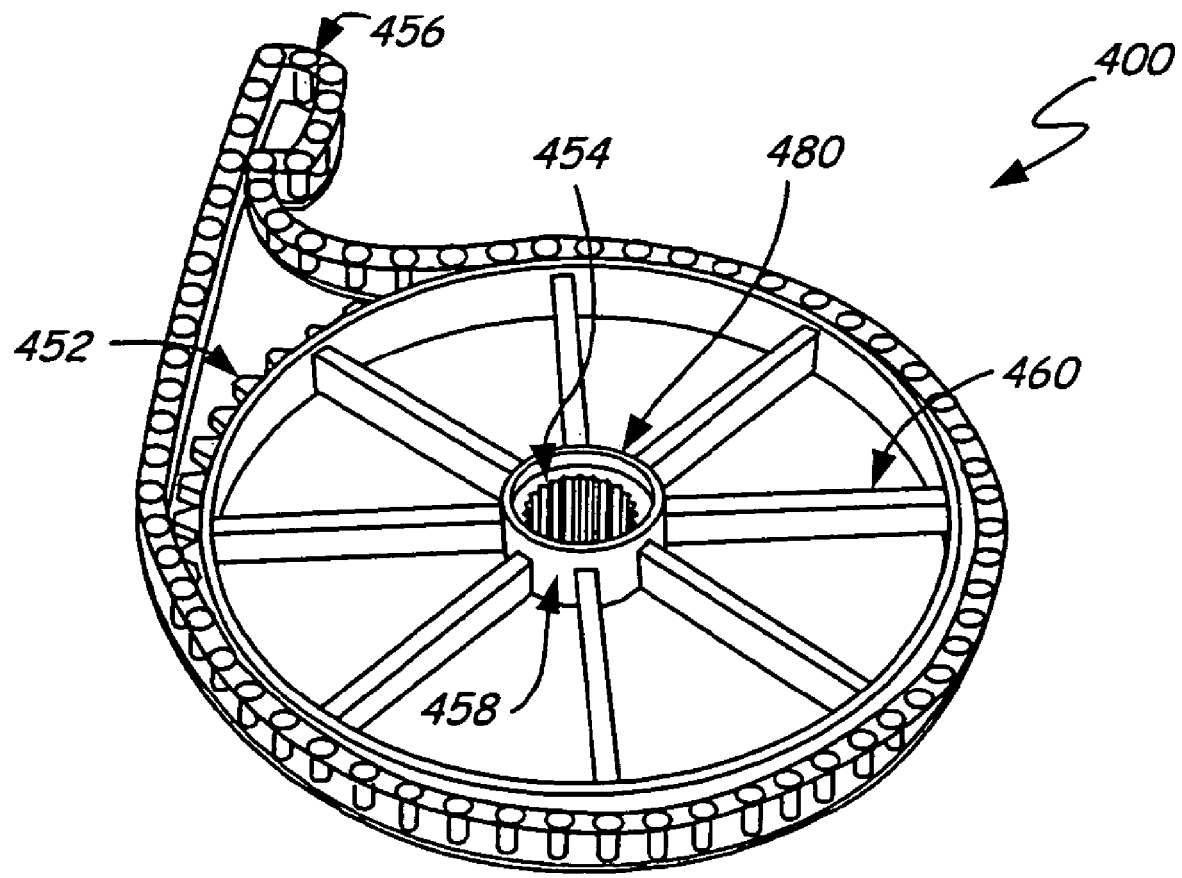
FIG. 4 is a top perspective view of an enhancement sprocket.

In accordance with one aspect of the present invention, a rotational mechanism other than a gear is attached to servo spline 102 in a manner substantially similar to the attachment scheme shown and described in relation to FIGS. 1-3. FIG. 4 is a perspective view of a sprocket 400. Sprocket 400 includes a plurality of teeth 452 disposed around an outer perimeter of sprocket 400. A chain 456 is in engagement with a substantial number of teeth 452. A hub 458 is located within the center of sprocket 400 and is supported by a plurality of spokes 460.

Hub 458 includes a spline receiver 454. Spline receiver 454 is illustratively similar to spline receiver 154 (FIG. 2) in that it is configured to engage a standard hobby servo output spline 102 (FIG. 1). Different versions of sprocket 400 can be selected and/or created to accommodate different servo splines 102. A sprocket 400 having a spline receiver 454 configured to receive a 23, 24, 25 tooth or any other output spline configuration is within the scope of the present invention.

Engagement of a sprocket 400 to a servo motor 100 is illustratively similar to the engagement schemes described in relation to FIGS. 1-3. Spline receiver 454 is engaged to spline 102. In accordance with one embodiment, a washer/screw arrangement is utilized to secure the sprocket to the servo as was previously described. In accordance with another embodiment, however, the outside portion of hub 458 (opposite the side where the servo spline is inserted) is configured such that the spline receiver 154 aperture is closed but for an opening large enough for insertion of an attachment mechanism (i.e., a screw). In this case, a washer is not necessary because a screw can be inserted through the aperture and into the engagement with the servo spline 102. As a screw is tightened into engagement with the servo spline 102, the head of the screw will engage the sprocket hub and secure the sprocket to the servo (i.e., secure the servo spline within hub 458).

In accordance with one aspect of the present invention, hub 458 of sprocket 400 is configured such that a surface of the sprocket will flushly engage a surface of the servo motor when the motor and sprocket are functionally engaged to one another. As is shown in FIG. 4, an annular lip 480 is formed on the inside of hub 458 to enable a flush engagement with surface 108 illustrated in FIG. 1.

In accordance with one aspect of the present invention, any rotational device can be attached to a servo output shaft in a manner as described herein in the context of a gear and a sprocket. Once attached to the servo output shaft, the item will generally rotate when the output shaft rotates. Accordingly, the rotation of the item will be limited just as is the rotation of the output shaft.

As was mentioned above, some mechanical applications require a servo having a range of rotation greater than the range typically associated with a hobby servo. Also, some mechanical applications require a servo having greater torque power than that typically associated with a hobby servo. The present invention pertains to simple and inexpensive enhancements for hobby servos that are capable of enabling a greater range of rotation, or a greater range of torque power, than typically associated with a hobby servo without sacrificing proportional control characteristics.

Accordingly, a gear, sprocket or any other rotational mechanism can be secured to the output shaft of a hobby servo. In accordance with one aspect of the present invention, the hobby servo can then be mounted in a frame and configured to translate rotational motion to a shaft that is rotatably mounted within the same frame. The shaft will then be configured for a torque and/or rotational capacity that is greater than the output shaft of the servo itself.

Figure 5:
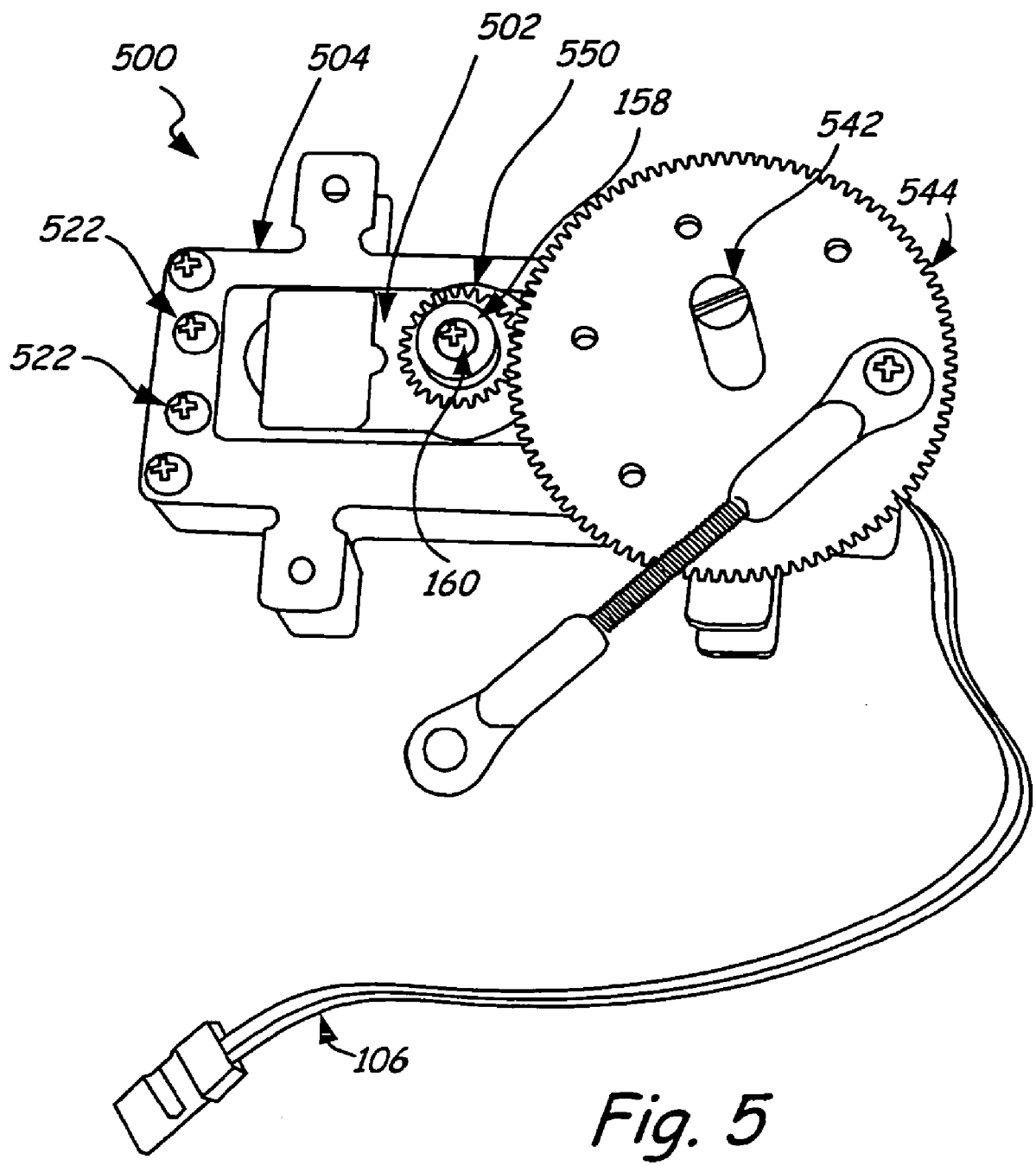
FIG. 5 is a top perspective view of an apparatus for extending the torque capacity of a hobby servo motor.

FIG. 5 is a perspective view of an apparatus 500 for extending the operational capacity of a servo motor 502. Servo 502 is secured within frame 504. For example, frame 504 illustratively includes apertures formed therein and configured to receive an attachment mechanism (e.g., a screw, bolt, etc). In one embodiment, apertures formed in frame 504 are configured to line up with apertures formed in attachment flanges 104 (FIG. 1). An attachment mechanism can then be inserted through the apertures in flanges 104 that are lined up with corresponding apertures in frame 504. In this way, the servo can be secured to the frame. Within FIG. 5, screws 522 are illustrated. These screws illustratively are inserted through apertures in a flange 104, and through corresponding apertures formed in the frame. A bolt can then be engaged to the ends of the screws 522 so as to secure a flange 104 to the frame 504. A gear 550 is attached to the output spline of servo motor 502 with a screw 160 and a washer 158 as described in relation to FIGS. 1-3 (another attachment scheme such as the non-washer scheme described in relation to sprocket 400 in FIG. 4 could alternatively be utilized). Gear 550 is illustratively similar to gear 150 (FIG. 2) only smaller. Servo 502 is illustratively similar to servo 100. The servo output shaft illustratively has a limited capacity for rotation (e.g., around 180°).

An auxiliary shaft 542 is rotatably mounted in frame 504 and is displaced from servo 502. An auxiliary gear 544 is attached to auxiliary shaft 542 and engaged via gear teeth to gear 550. Again, gear 550 is attached to the output shaft of servo 502. Accordingly, when the output shaft of servo 502 is caused to rotate, gear 550 causes that rotation to be translated to auxiliary gear 544, and therefore to auxiliary shaft 542. Because gear 550 is considerably smaller than auxiliary gear 544, the torque associated with auxiliary shaft 542 will be much greater than the torque of the servo motor output shaft. The expanded torque associated with shaft 542 can then be configured to actuate a mechanical load. For example, an item can be attached to auxiliary shaft 542 (or attached to gear 544) and utilized to mechanically take advantage of the expanded torque.

In accordance with another embodiment, auxiliary gear 544 has a diameter that is much less than the diameter of gear 550. Accordingly, when gear 550 is attached to a hobby servo output shaft, and when gear 544 is attached to an auxiliary shaft, then auxiliary shaft 542 will produce a range of rotation that is greater than that generated by the output shaft of the hobby servo.

Figure 6:
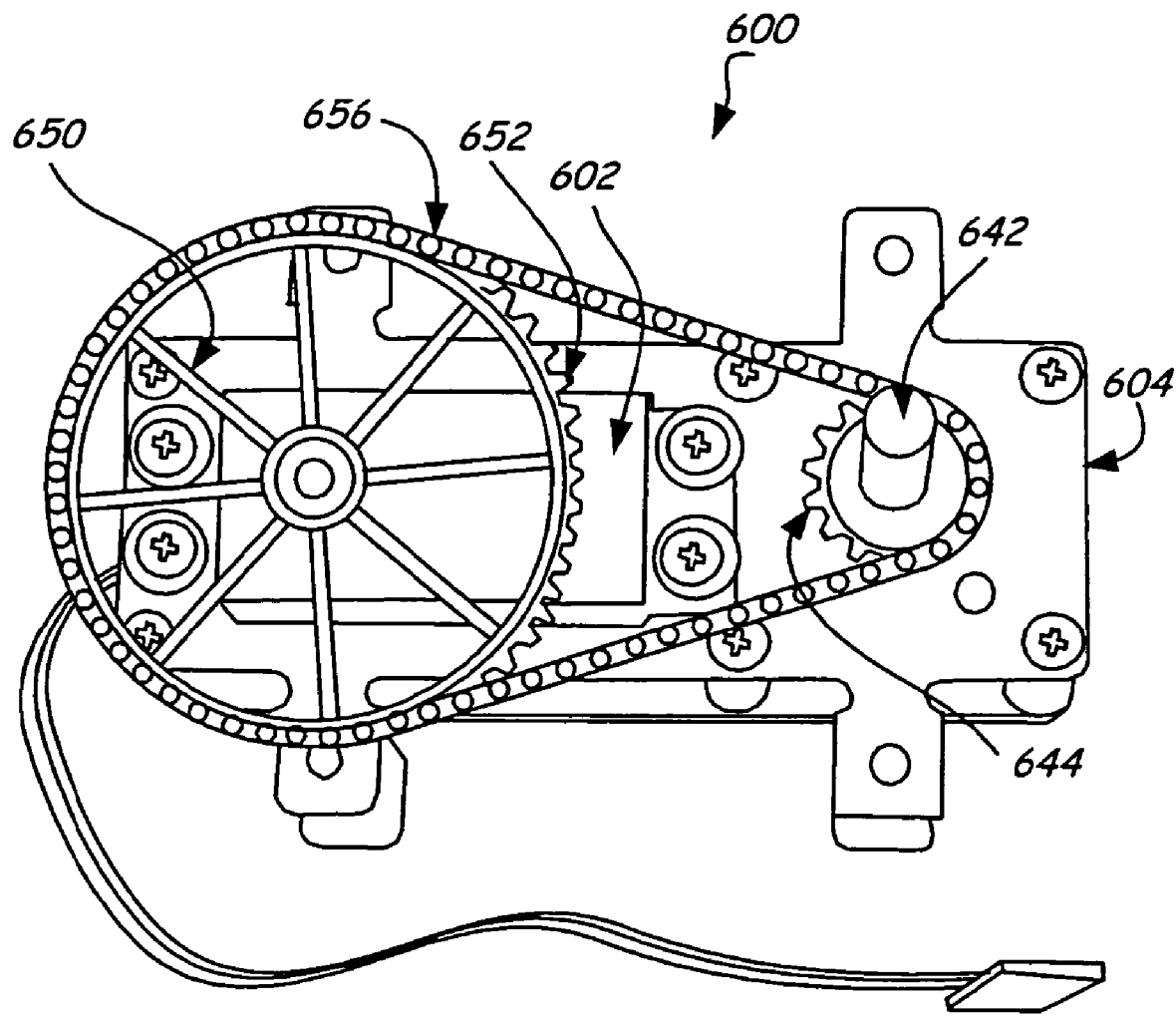
FIG. 6 is a top perspective view of an apparatus for extending the rotational capacity of a hobby servo motor.

FIG. 6 is a top perspective view of an apparatus 600 for extending the operational capacity of a servo motor. FIG. 6 shows a hobby servo 602 mounted within a frame 604. Servo 602 is illustratively similar to servo 502. Similar to the FIG. 5 configuration, auxiliary shaft 642 is rotatably mounted within frame 604 and is displaced from hobby servo 602. A chain 656 is engaged to teeth 652 of an enhancement sprocket 650. An auxiliary gear 644 is attached to auxiliary shaft 642. Illustratively, enhancement sprocket 650 can be attached to the output shaft of hobby servo 602 as was described in relation to FIG. 4. Chain 656 illustratively stays engaged to teeth 652 while chain 656 becomes engaged to auxiliary gear 644. Accordingly, when the output shaft of hobby servo 602 is caused to rotate, chain 656 causes that rotation to be translated to auxiliary gear 644 and therefore to auxiliary shaft 642. Because enhancement sprocket 650 is considerably larger than auxiliary sprocket 644, the rotation of auxiliary shaft 642 will be much greater than the rotation of the output shaft of hobby servo 602 and much greater than the overall rotation of enhancement sprocket 650. The expanded rotation of auxiliary shaft 642 can then be configured to actuate a mechanical load. For example, a mechanical item can be attached to auxiliary shaft 642 and utilized to mechanically take advantage of the expanded rotational motion.

In accordance with one embodiment, enhancement sprocket 650 has a diameter that is much less than the diameter of the corresponding auxiliary gear 644. Accordingly, when enhancement sprocket 650 is attached to a hobby servo output shaft, and when auxiliary gear 644 is attached to an auxiliary shaft, and when chain 656 is in place, then auxiliary shaft 642 will produce a torque power that is greater than that generated by the output shaft of the hobby servo.

In accordance with another embodiment, a belt design can be utilized rather than a chain design. For example, enhancement sprocket 650 and auxiliary gear 644 can be configured to accommodate a belt rather than a chain. Accordingly, as the output shaft rotates and causes enhancement sprocket 650 to rotate, a frictionally engaged belt moves around the outside diameter of the enhancement sprocket as well as around the outside diameter of the auxiliary gear, such that rotational motion is translated from the output shaft to the auxiliary shaft. When a belt is utilized, enhancement sprocket 650 and auxiliary gear 644 need not necessarily have gear teeth.

As was described in relation to FIG. 5, in accordance with another aspect of the present invention, neither a belt nor a chain is utilized. Instead, enhancement sprocket 650 and auxiliary gear 644 are directly geared to one another. The enhancement sprocket 650 is secured to the output shaft of the hobby servo 602 as discussed in relation to FIGS. 1-3. The enhancement sprocket 650 is directly and operably engaged to auxiliary gear 644. Auxiliary gear 644 is configured to translate rotational motion to auxiliary shaft 642.

Figure 7:
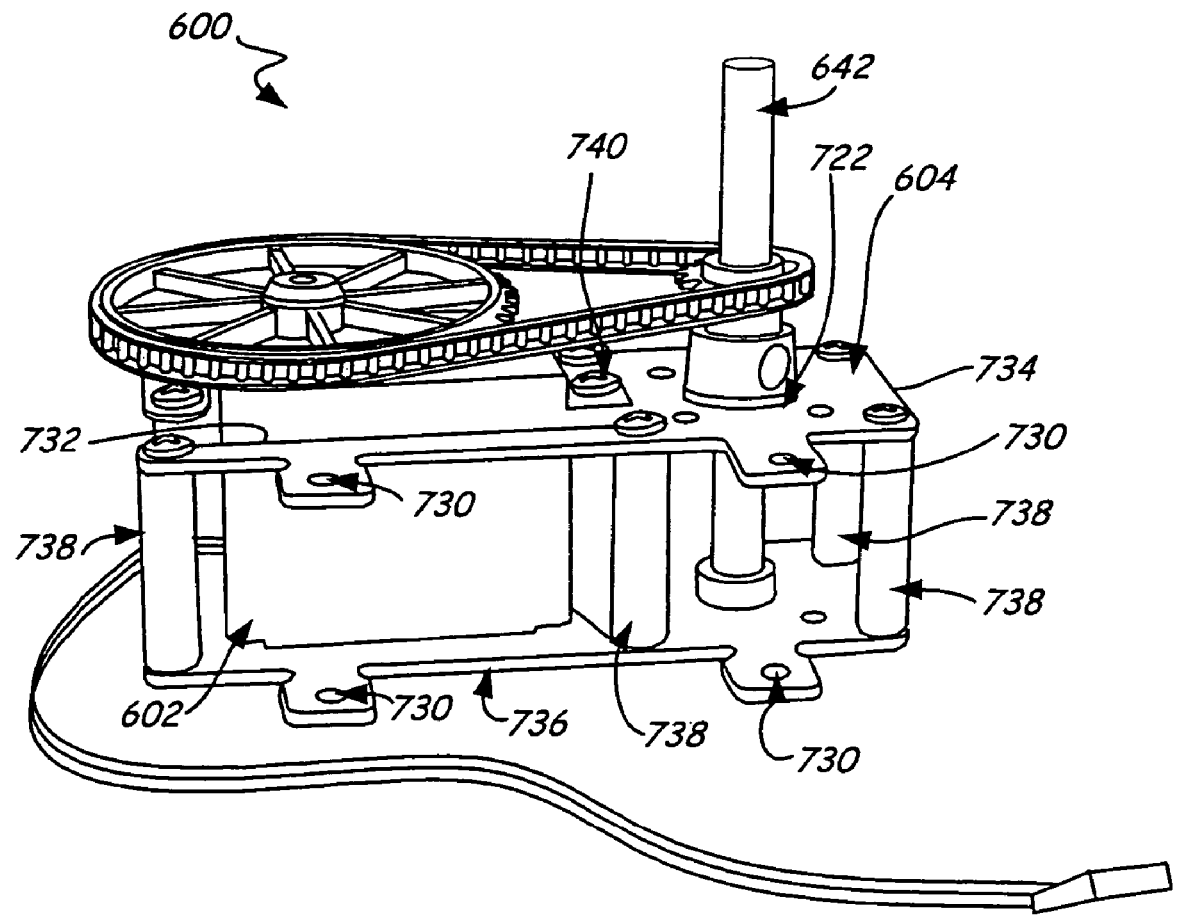
FIG. 7 is a side perspective view of an apparatus for extending the rotational capacity of a hobby servo motor.

FIG. 7 is a side perspective view of the apparatus 600 previously illustrated and described in relation to FIG. 6. The view shown in FIG. 7 demonstrates how frame 604 is constructed. Frame 604 includes apertures 730 for receiving an attachment mechanism (e.g., a screw, bolt, etc) for attaching apparatus 600 within an operational environment. For example, the frame could be secured in a location proximate to a target for mechanical actuation. The frame member includes a first aperture 732 for receiving and supporting servo 602. A second aperture 722 is also formed in the frame and is configured to receive and support auxiliary shaft 642.

Attachment apertures 740 are formed in the frame as necessary to accommodate attachment of servo 602 to the frame (e.g., attachment flanges associated with the servo have apertures that are lined up with the attachment apertures 740 within the frame . . . and an attachment mechanism is slid through the aligned apertures to secure the servo to the frame).

Frame 604 includes a first panel portion 734 that is displaced from but connected to a second panel portion 736. A displacement mechanism 738 is positioned between panels 734 and 736. In fact, several displacement portions 738 are utilized to space and support the panel portions relative to one another. Each displacement mechanism 738 is illustratively attached to the first and second panel portions. For example, an attachment mechanism (e.g., a screw, an adhesive, etc) is utilized to secure the displacement mechanisms 738 between the panel portions. In one embodiment, a screw is inserted through an aperture in a panel portion and into the displacement portion 738. The screw can extend all the way through the displacement portion 738 and through a corresponding aperture formed in the opposite panel portion, wherein a bolt is then utilized to secure the panel portions to the displacement mechanism. Alternatively, a single screw can be inserted through each end of the displacement mechanism through an aperture formed in the panel portion such that the screws engage and secure themselves to the inside of the displacement portion thereby securing the panel portions to the displacement portion.

Figure 8A:
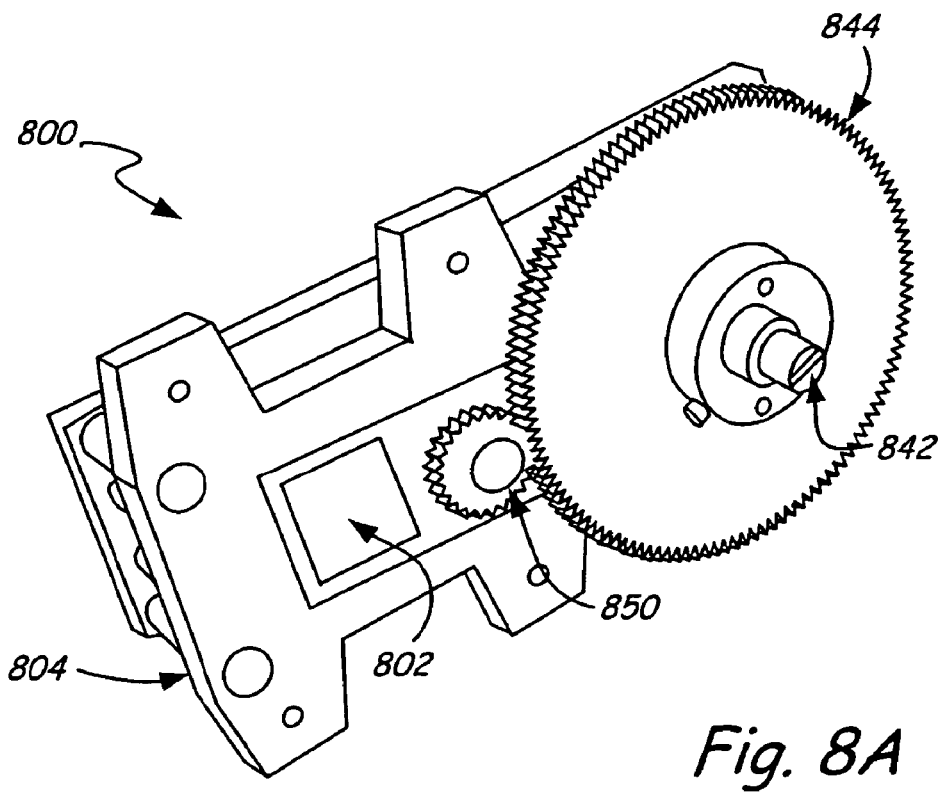
FIG. 8A is a front perspective view of an apparatus for extending the operational capacity of a servo motor.
Figure 8B:
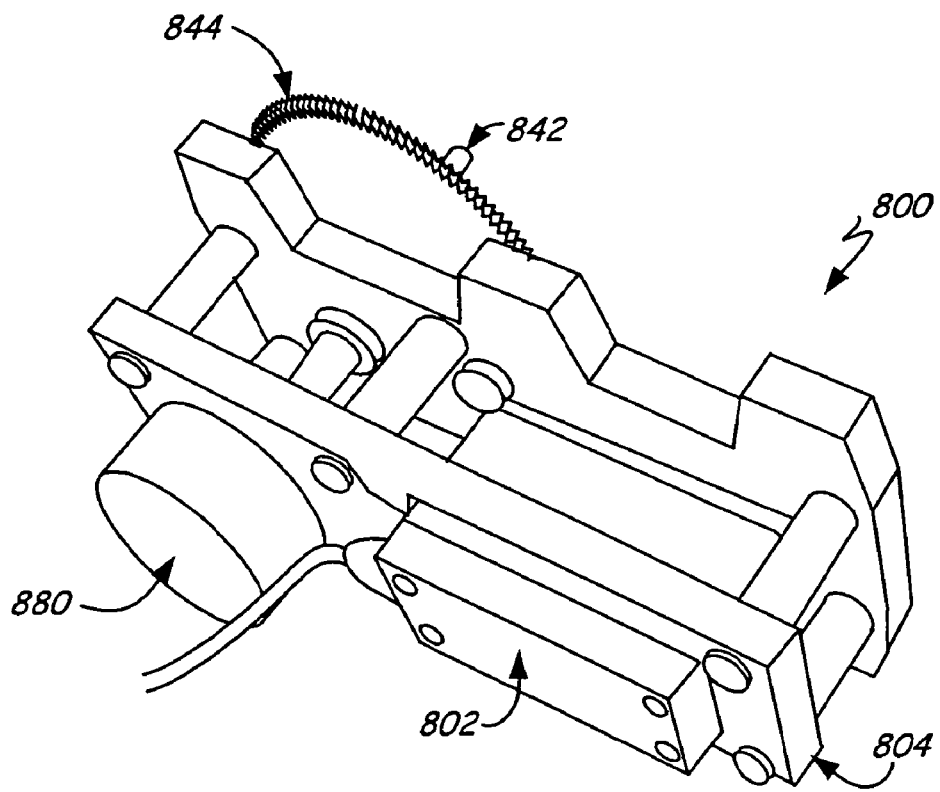
FIG. 8B is a back perspective view of the apparatus of FIG. 8A.

FIGS. 8A and 8B, in accordance with one aspect of the present invention, are front and back views, respectively, of a different apparatus 800 for extending the operational capacity of a servo motor. Apparatus 800 is similar in many aspects to embodiments previously illustrated and described herein. Hobby servo 802 and auxiliary shaft 842 are mounted within frame 804. Auxiliary gear 844 is attached to auxiliary shaft 842 and is rotatably coupled to servo motor gear 850 in a manner similar to that illustrated in FIGS. 3-6. For example, means such as a directed engagement, shown in FIG. 5, or a chain, shown in FIGS. 4 and 6, or any other means may be used to translate rotation from the servo output shaft to auxiliary gear 844 and shaft 842. In accordance with the illustrated embodiment, apparatus 800 is configured in a torque enhancement configuration (an enhanced rotation configuration may alternatively be implemented). In the illustrated configuration, gear 850 has a diameter much less than the diameter of auxiliary gear 844. As a result, the torque capacity associated with auxiliary shaft 842 will be greater than the torque capacity of the servo motor gear 850. The expanded torque capacity associated with shaft 842 can be taken advantage of to actuate increased mechanical loads. For example, an item can be attached to auxiliary shaft 842 (or to gear 844) and utilized to mechanically take advantage of the expanded torque capacity.

Another result of the illustrated configuration, however, is that auxiliary gear 844 will have an angular rotational range which is even less than the standard angular rotational range of hobby servo gear 850. Most hobby servos have a predetermined rotational range of approximately 180°. The illustrated auxiliary gear 844 will have a rotational range of even less than 180°. For certain applications, expanded torque is needed without sacrificing rotational range.

In accordance with another aspect of the present invention, hobby servo 802 is internally modified to enable a range of output shaft rotation that is greater than its "off-the-shelf" capability. For example, in accordance with one embodiment, an internal mechanical stopping mechanism, which prevents rotation past a predetermined angle, is removed from hobby servo 802 to enable for continuous rotation in either direction. As a result of the modification, servo 802 can rotate auxiliary gear 844 beyond the range of rotation attributed to the gear prior to the servo modification.

Following modification of servo 802, limitations inherent to the internal potentiometer make it a poor choice for subsequent control functionality. As previously mentioned, in a normal servo operating configuration, the servo motor rotates the servo output shaft corresponding to the coded signal received by the servo. The output shaft is rotated until the signal from the internal potentiometer of the servo, which corresponds to the angular position of the servo output shaft, matches the coded signal received by the servo. Most hobby servos contain internal potentiometers that are physically limited to monitoring a limited range of angles (e.g., often less than 200 degrees). Therefore, when apparatus 800 is configured in the illustrated enhanced torque configuration and incorporates a servo 802 modified for extended rotation, the internal potentiometer is not the best control component for applications that require the servo shaft to rotate beyond the typical rotation limits in order to provide shaft 842 with an improved rotational capacity. The internal potentiometer is not likely to support control of a range of rotation for shaft 842 that is even equivalent to the original rotational range of the servo output shaft. Therefore, in accordance with one aspect of the present invention, the internal potentiometer is disconnected and an auxiliary potentiometer 880 is asserted into the control scheme. Potentiometer 880 is functionally connected to shaft 842 and facilitates the proportional control thereof.

Accordingly, as was mentioned above, some applications require increased (enhanced) torque while still demanding the same, or in some cases greater, rotational capacity. Therefore, in accordance with one aspect of the present invention, the external potentiometer 880 is attached to auxiliary shaft 842 and is utilized to control the rotation of auxiliary shaft 842. As a result, servo 802 utilizes the coded input signal and the signal from external potentiometer 880 to rotate and position auxiliary shaft 842. A particular external potentiometer 880 having any of a variety of control characteristics can be selected and implemented based on the requirements of a given application. Therefore, a potentiometer with a rotational range of substantially less than or greater than 180° can be selected and implemented as desired.

In accordance with one embodiment, apparatus 800 is configured in an extended rotation configuration. In this configuration, as previously mentioned, servo gear 850 has a diameter substantially greater than auxiliary gear 844. Further, in accordance with this embodiment, external potentiometer 880 is configured to provide rotational and/or position control over the extended range of rotation of auxiliary shaft 842.

In accordance with one aspect of the present invention, FIGS. 9A-9K are diagrammatic illustrations demonstrating alteration of a hobby servo including removal of rotation impediments and disconnection of the internal potentiometer. While many types and brands of hobby servos can be modified in a manner similar to the processes described herein, FIGS. 9A-9K are directed to the removal of mechanical stops from a Hitec HS-645MG hobby servo available from Hitec RCD USA, Inc. located in Poway, Calif.

Figure 9A:
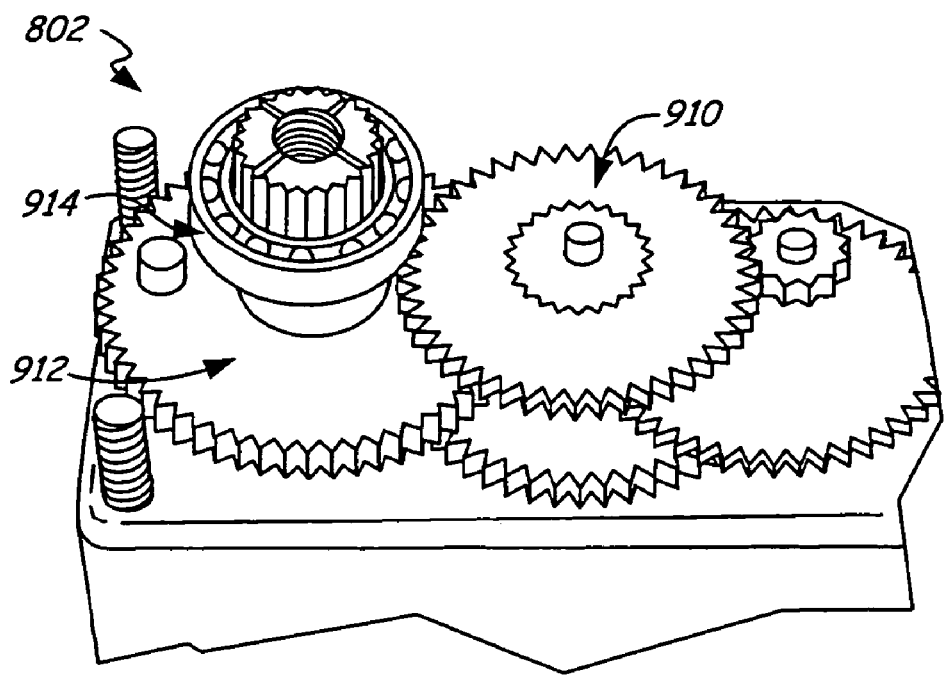
FIGS. 9A-9K are diagrammatic illustrations demonstrating alteration of a hobby servo motor.
Figure 9B:
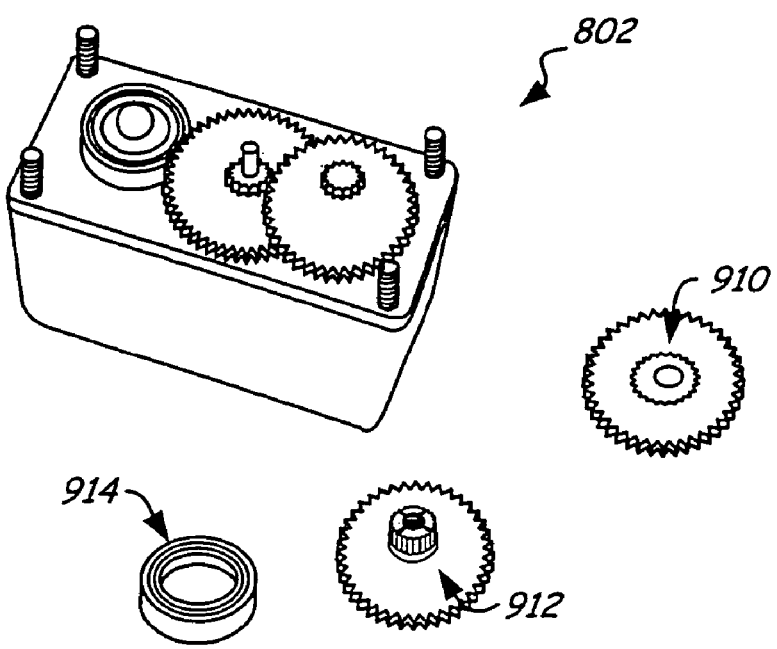
Figure 9C:
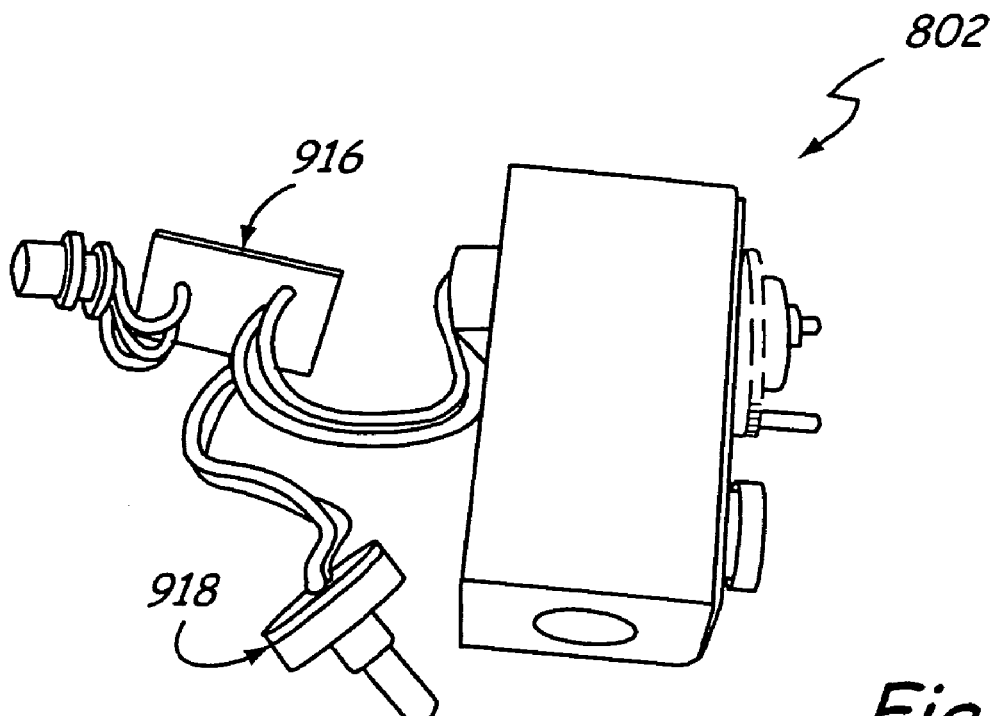
Figure 9D:
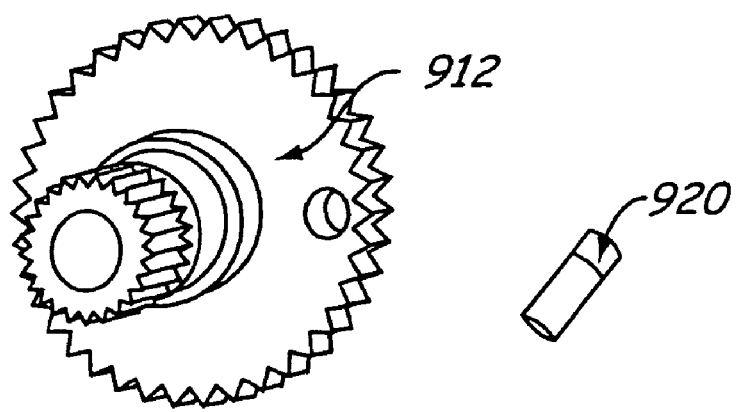
Figure 9E:
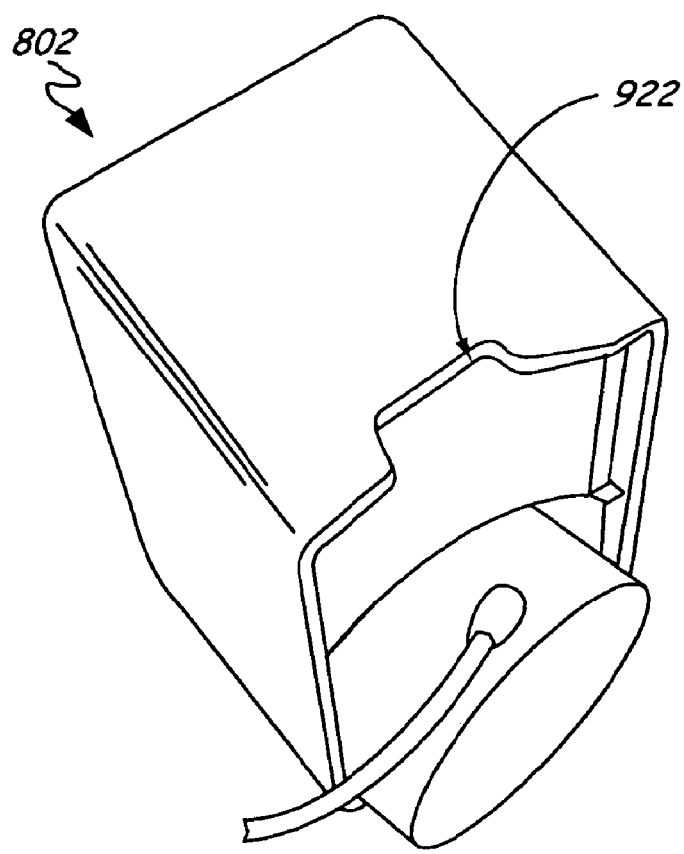

In accordance with FIG. 9A, screws are removed from the bottom of the servo 802 and the top gear case (not pictured) is removed to expose the drive gears. The second to last drive gear 910 is removed first, followed by the main spline (gear with shaft) gear 912 as illustrated in FIG. 9B. Further, the bushing or bearing 914 is removed from the spline gear 912 (also as pictured in FIG. 9B). Not all servos have a bushing or bearing. In some cases, the outer gear case cover is configured to serve as a bushing. The bottom case (not pictured) is removed from the servo 802 and the electronics 916 and the potentiometer 918 are removed as illustrated in FIG. 9C. With the spline gear 912 out, pliers are used to remove the small pin stop 920 as shown in FIG. 9D (care must be exercised as to not damage the teeth on the gear). A utility knife is used to trim the case (make a groove 922) as illustrated in FIG. 9E to allow for extra wires that will be required to enter into the case when an auxiliary potentiometer is subsequently installed.

Figure 9F:
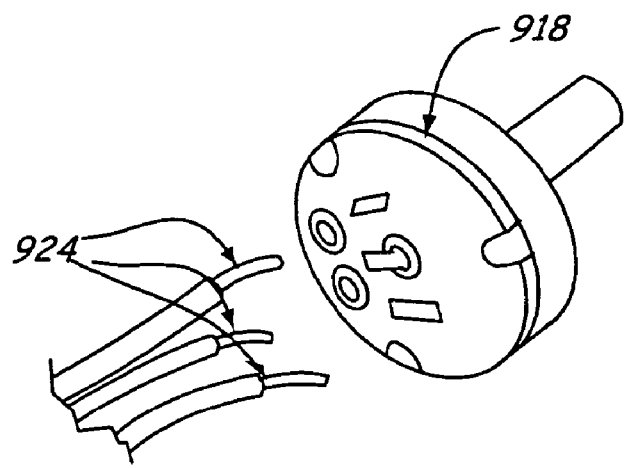
Figure 9G:
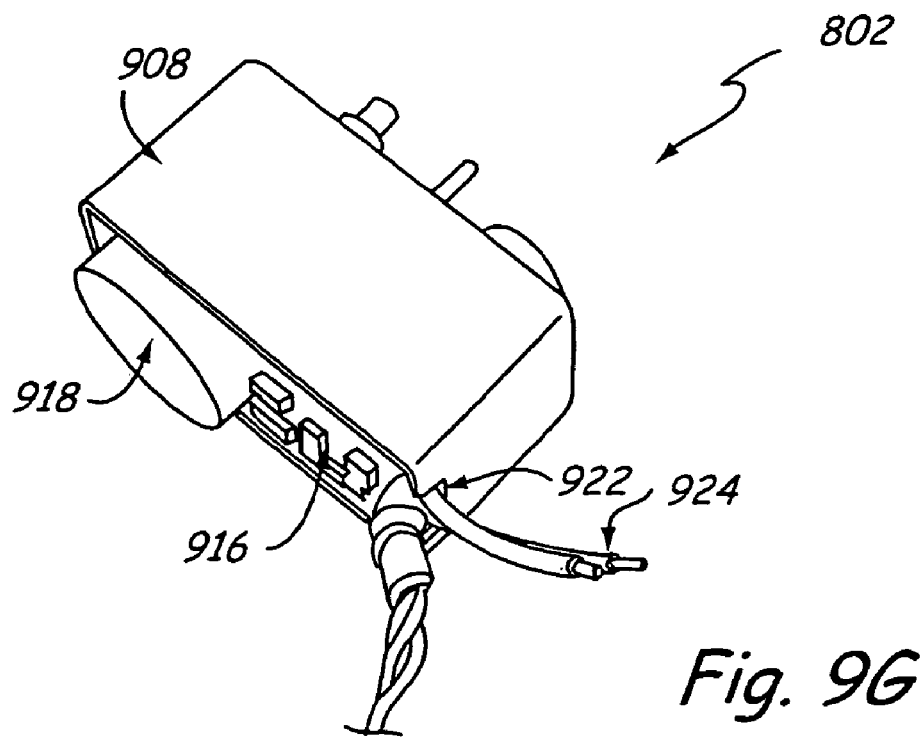
Figure 9H:
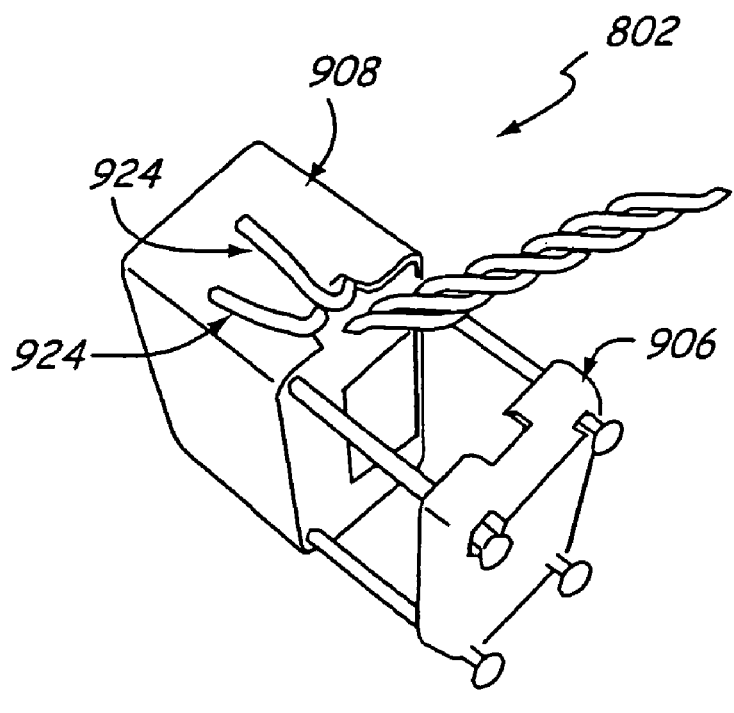
Figure 9I:
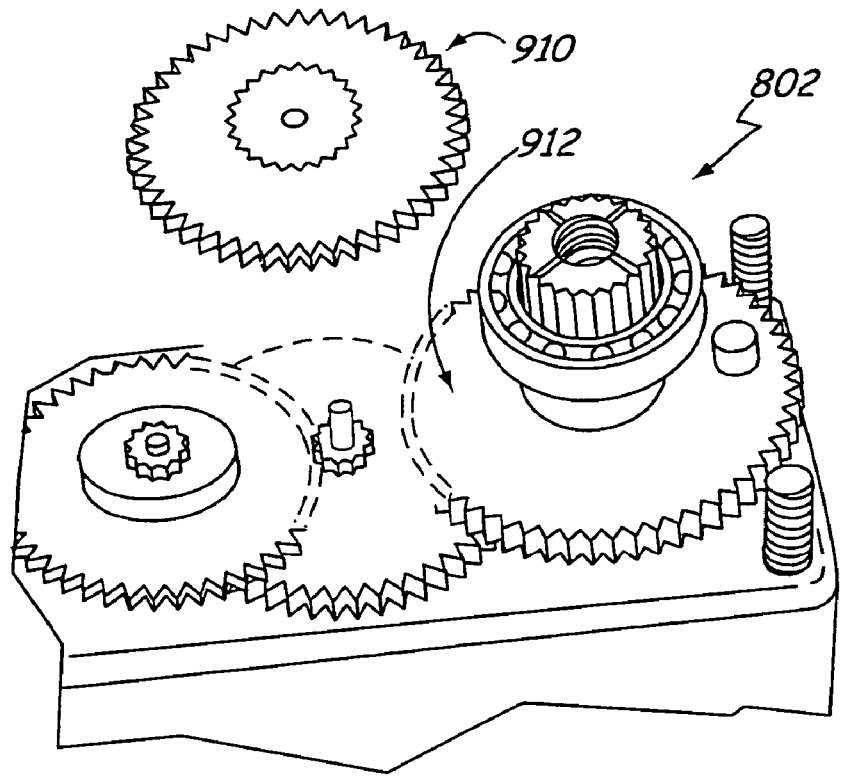
Figure 9J:
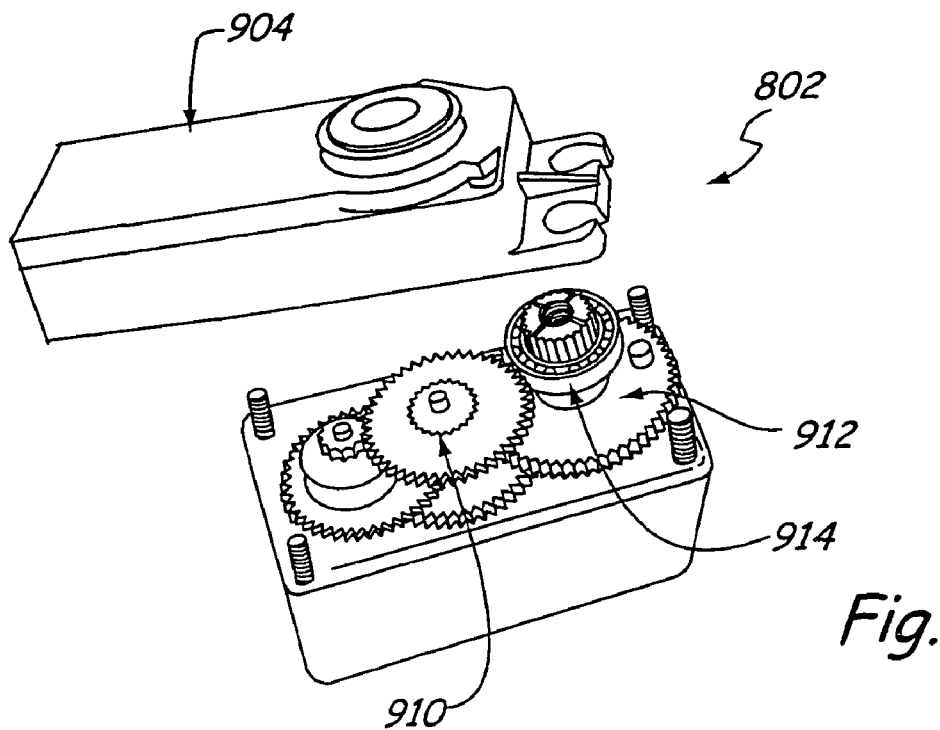
Figure 9K:
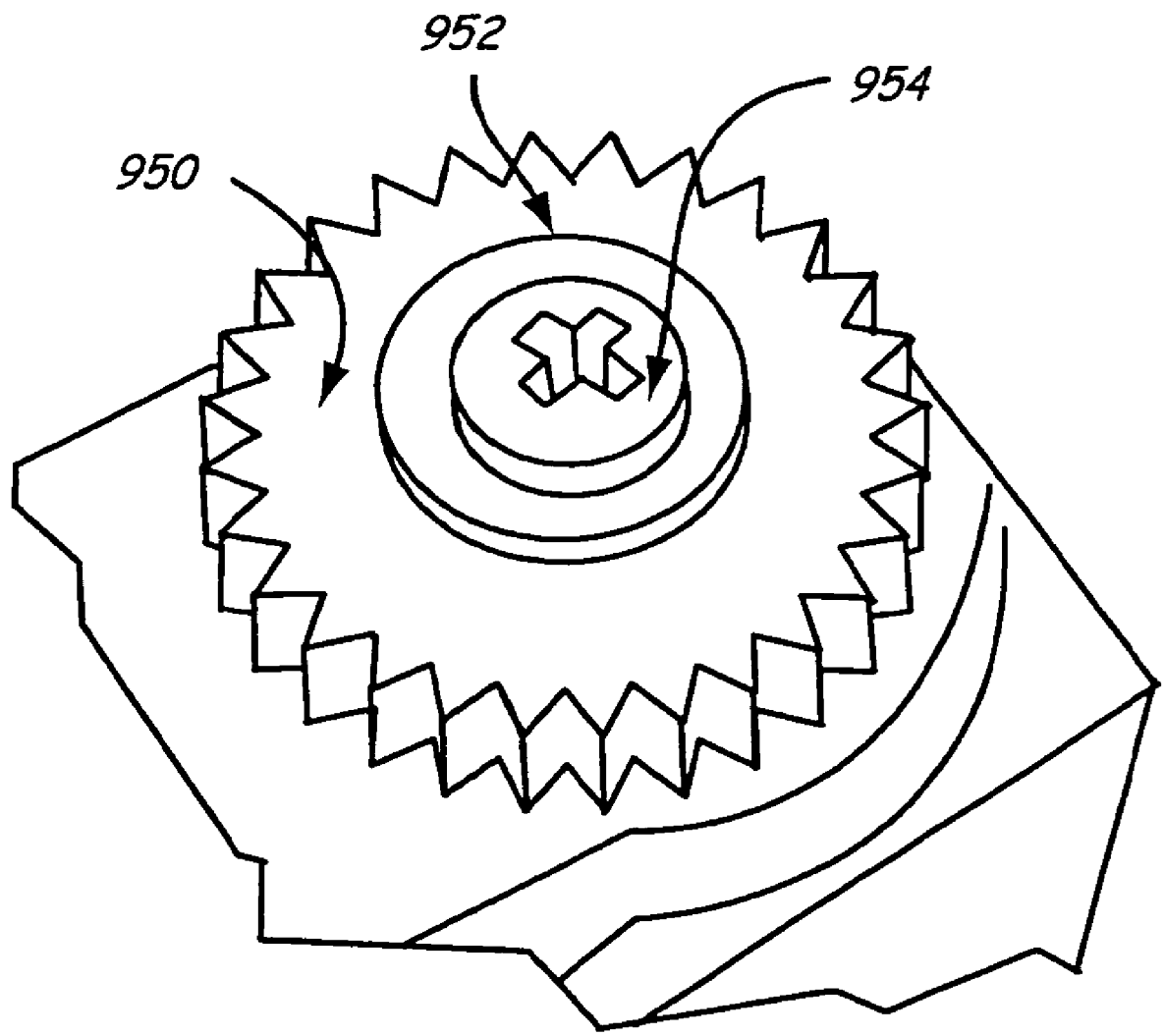

Wires 924 are disconnected from the internal potentiometer 918 using a soldering iron, while making note of the position of each colored wire 924 as different servos incorporate different colors and configurations (i.e. white=left, yellow=center, red=right) (shown in FIG. 9F). The electronics 916 and potentiometer 918 are put back in the case 908, illustrated in FIG. 9G, with the potentiometer wires 924 running through the groove 922 (created by the step shown in FIG. 9E). The bottom case 906 is replaced to cover the electronics 916 (FIG. 9H) and the gears are reassembled back in place (FIG. 9I). The bearing or bushing 914 is placed back on the main spline gear 912 and the top gear case 904 is placed back on the servo (FIG. 9J). The screws are replaced in the bottom of the servo and the pinion gear 950 is mounted onto the servo output shaft using a washer 952 and servo horn screw 954 (FIG. 9K). Pinion gear 950 is functionally similar to servo output gear 850 referenced to apparatus 800 in FIG. 8.

Figure 10A:
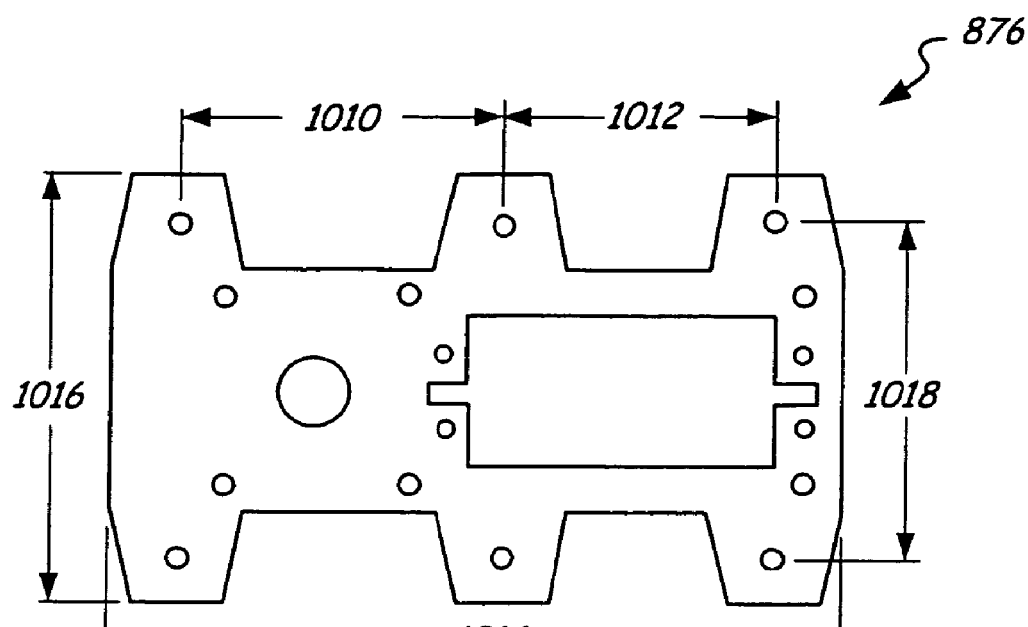
FIGS. 10A, 10B, 11, and 12A-12K are diagrammatic illustrations demonstrating construction of an apparatus for extending the operational capacity of a servo motor.
Figure 10B:
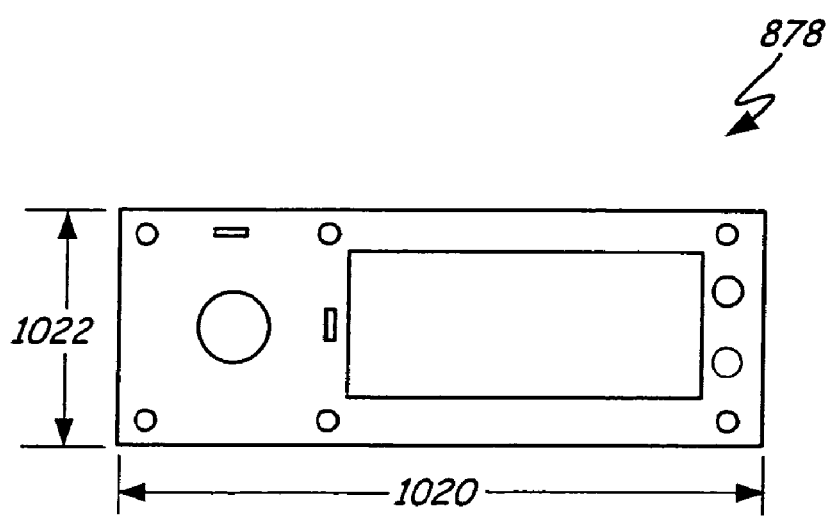
Figure 11:
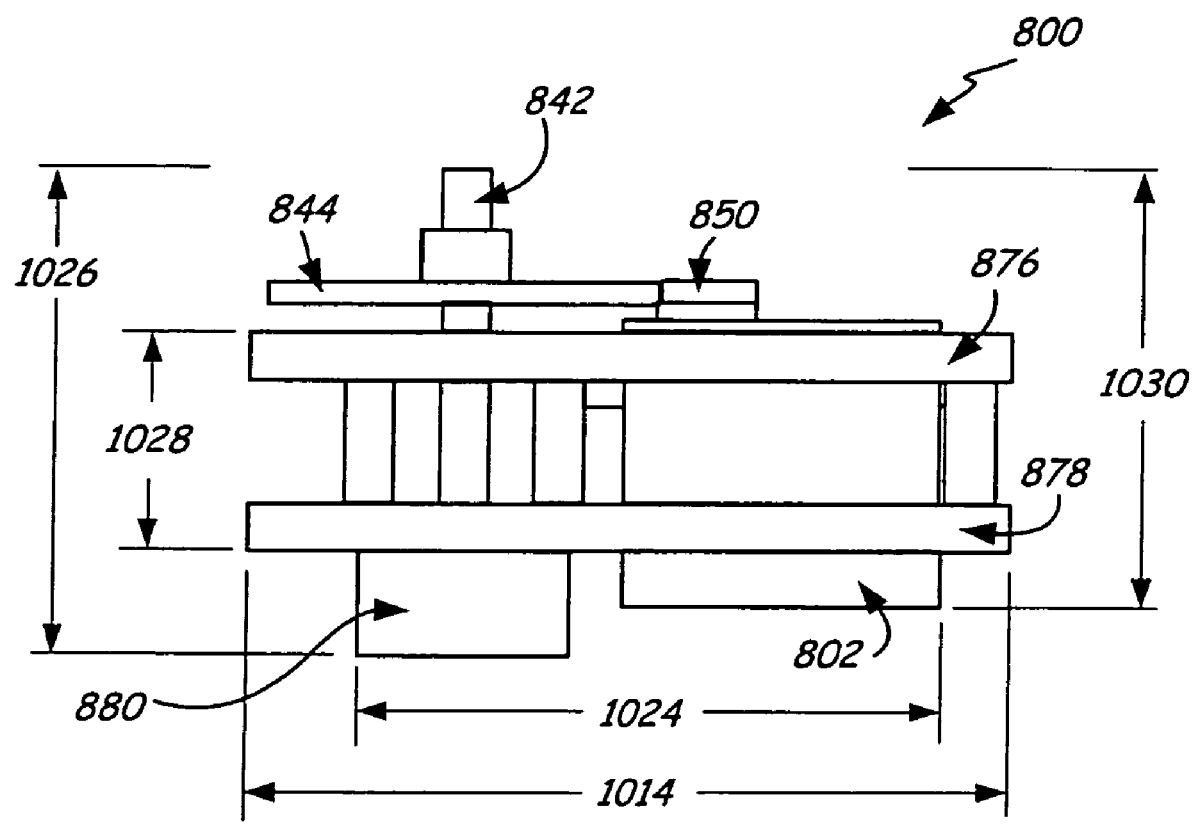

In accordance with one aspect of the present invention, FIGS. 10A, 10B, 11, and 12A-12K are diagrammatic illustrations demonstrating the construction of apparatus 800 and the connection of external potentiometer 880. FIG. 10A is a diagrammatic illustration demonstrating an illustrative layout of a top mounting plate 876 of apparatus 800. Plate 876 has a length 1014 of 3.907" and a width 1016 of 2.280". Distances 1010, 1012, and 1018 between mounting holes is 1.750", 1.457", and 1.780", respectively. A bottom mounting plate 878 of apparatus 800, represented in FIG. 10B, has a length 1020 of 3.447" and a width 1022 of 1.280". FIG. 11 is further directed to the configuration and layout of apparatus 800. Apparatus 800 has an overall length 1014 of 3.907" and height 1026 of 2.5". Distance 1024 between the edges of potentiometer 880 and servo 802 is 3.008". Distance 1028 from the edges of top mounting plate 876 and bottom mounting plate 878 is 1.12". Also, distance 1030 from the top edge of auxiliary shaft 842 to the bottom of servo 802 is 2.235".

It should be noted that all measurements provided herein are provided for the purpose of giving a complete description only. The present invention is not so limited. Other measurements are certainly within the scope of the present invention. It should also be noted that throughout the present description, preference numerals that are the same within multiple figures are intended to designate features that are the same or similar to another.

Figure 12A:
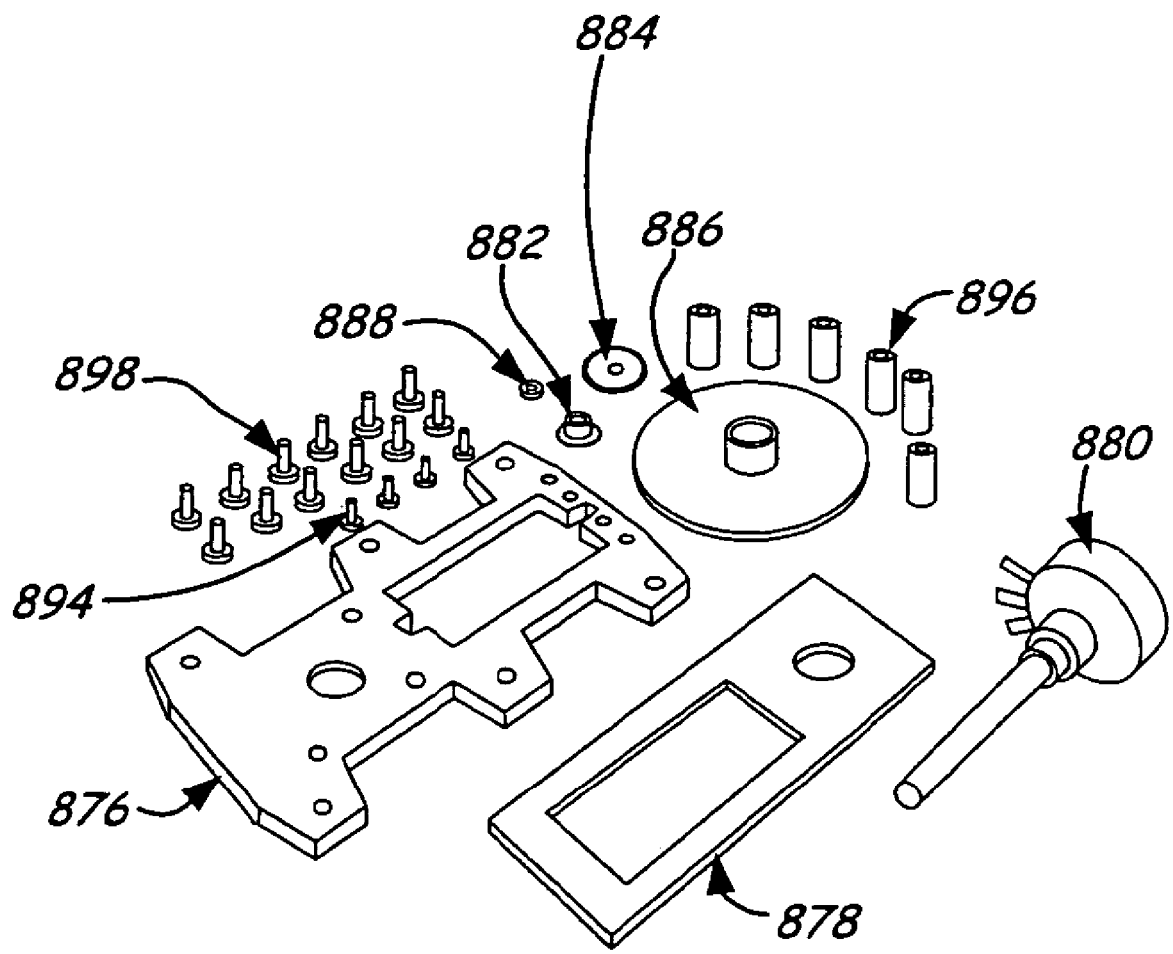
Figure 12B:
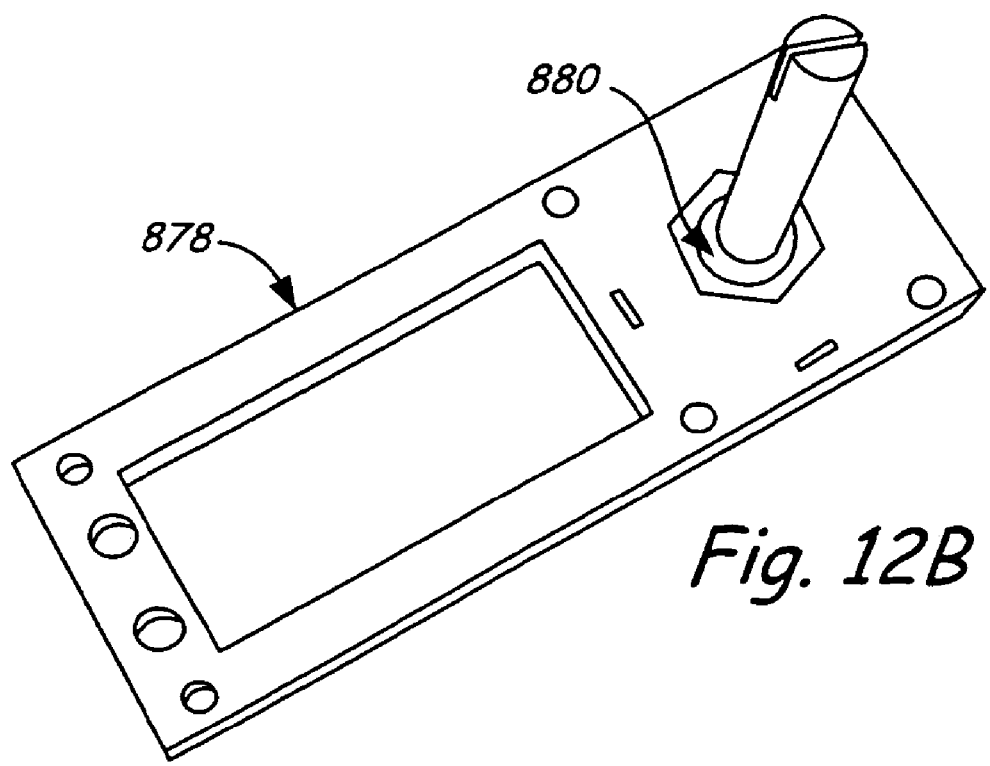
Figure 12C:
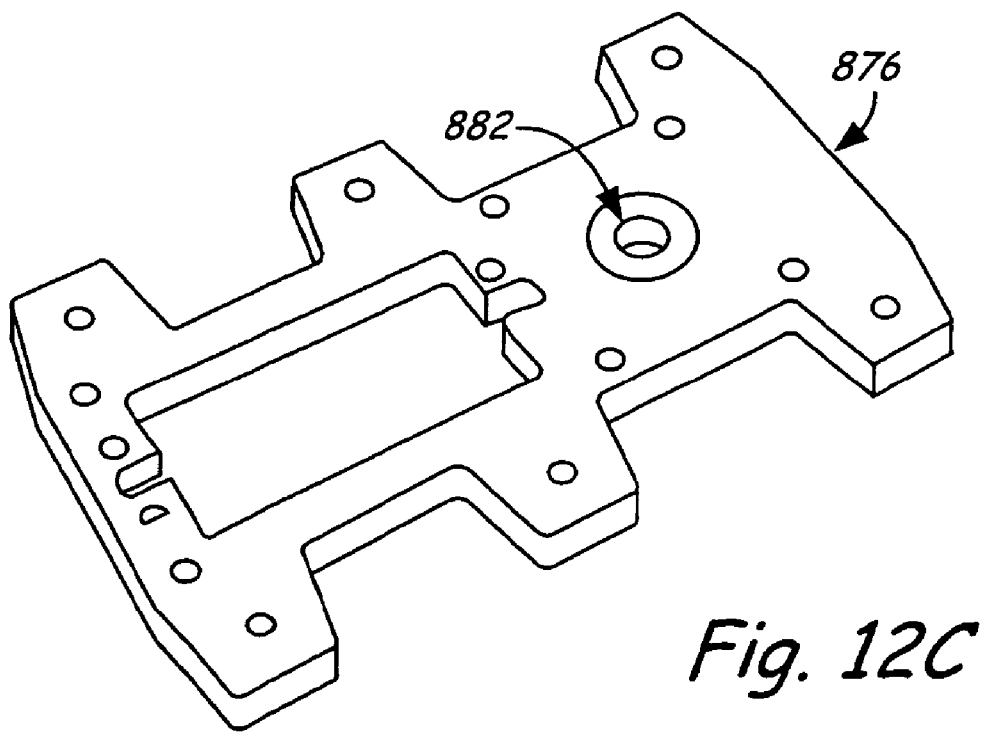
Figure 12D:
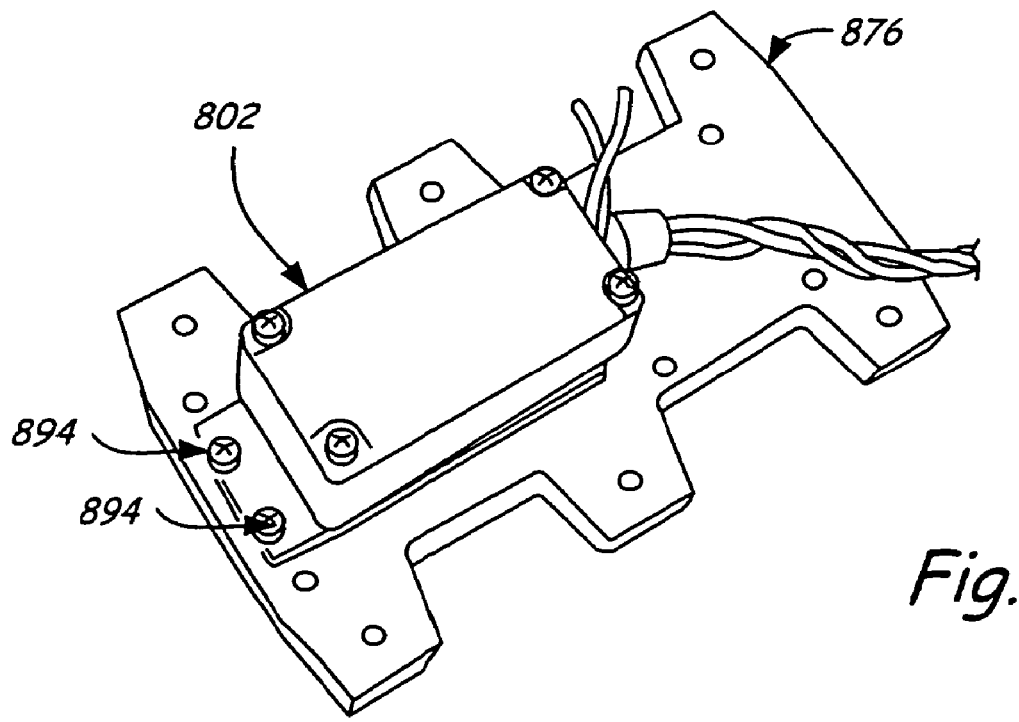
Figure 12E:
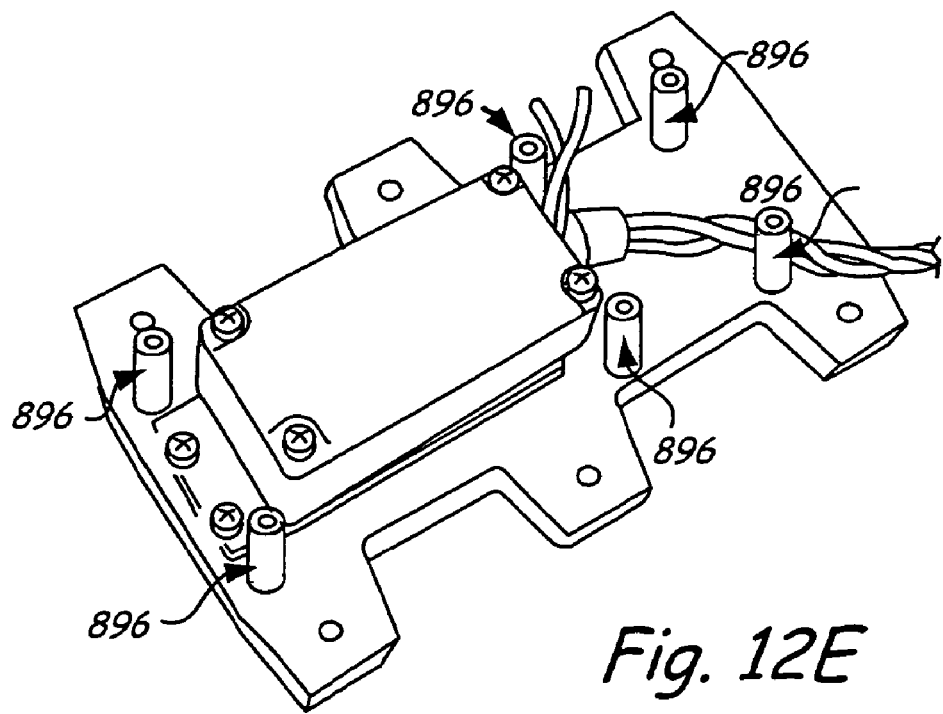
Figure 12:
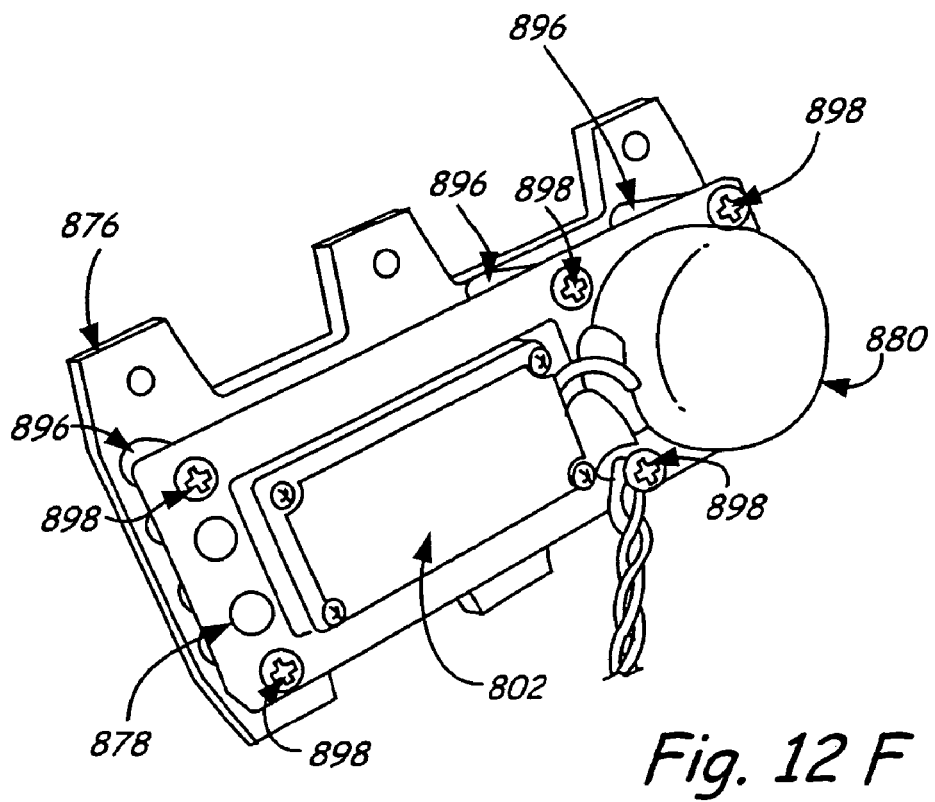
Figure 12:
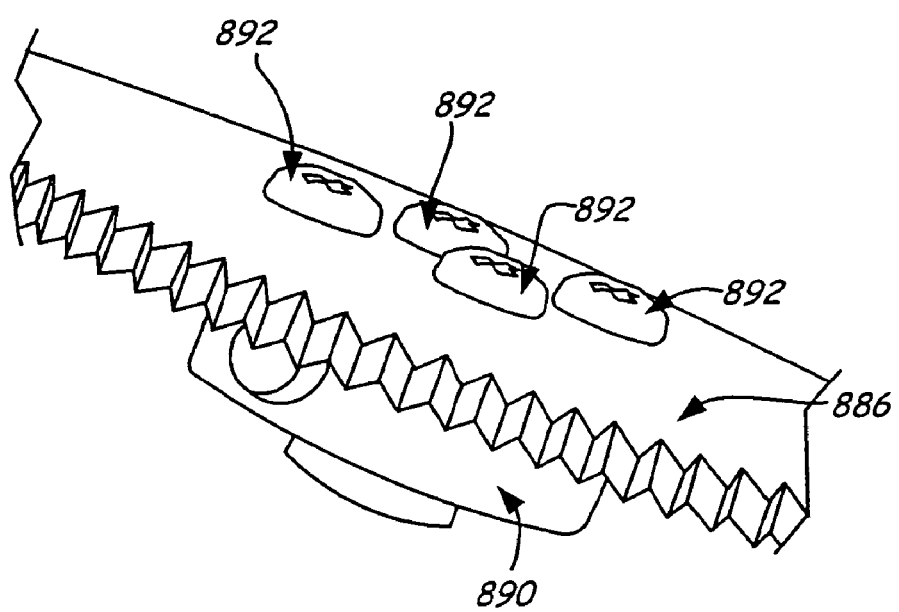
Figure 12H:
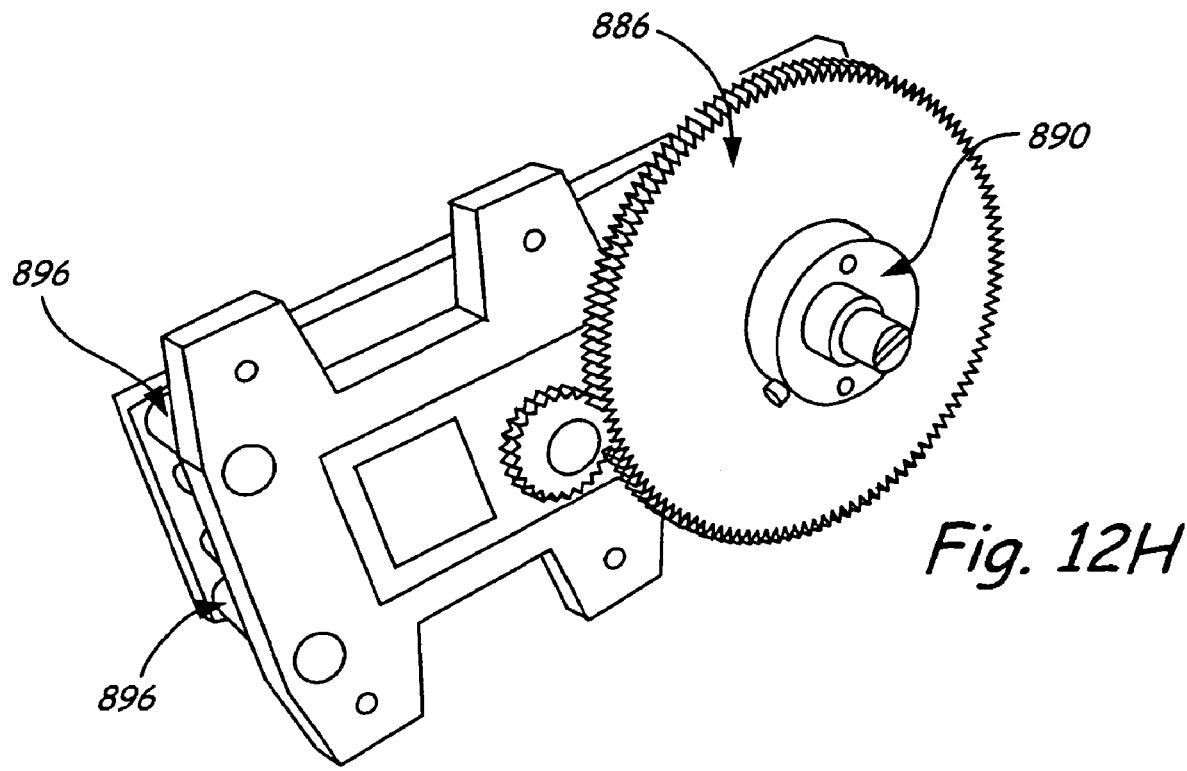
Figure 12I:
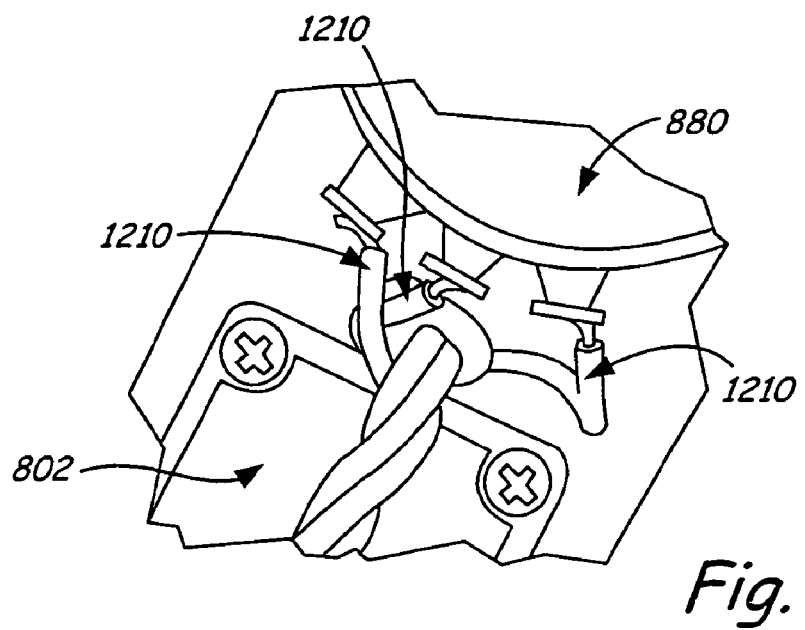
Figure 12J:
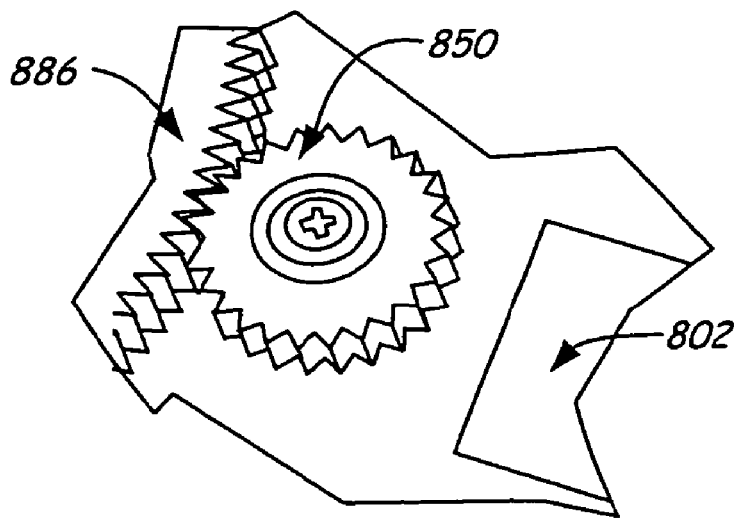
Figure 12K:
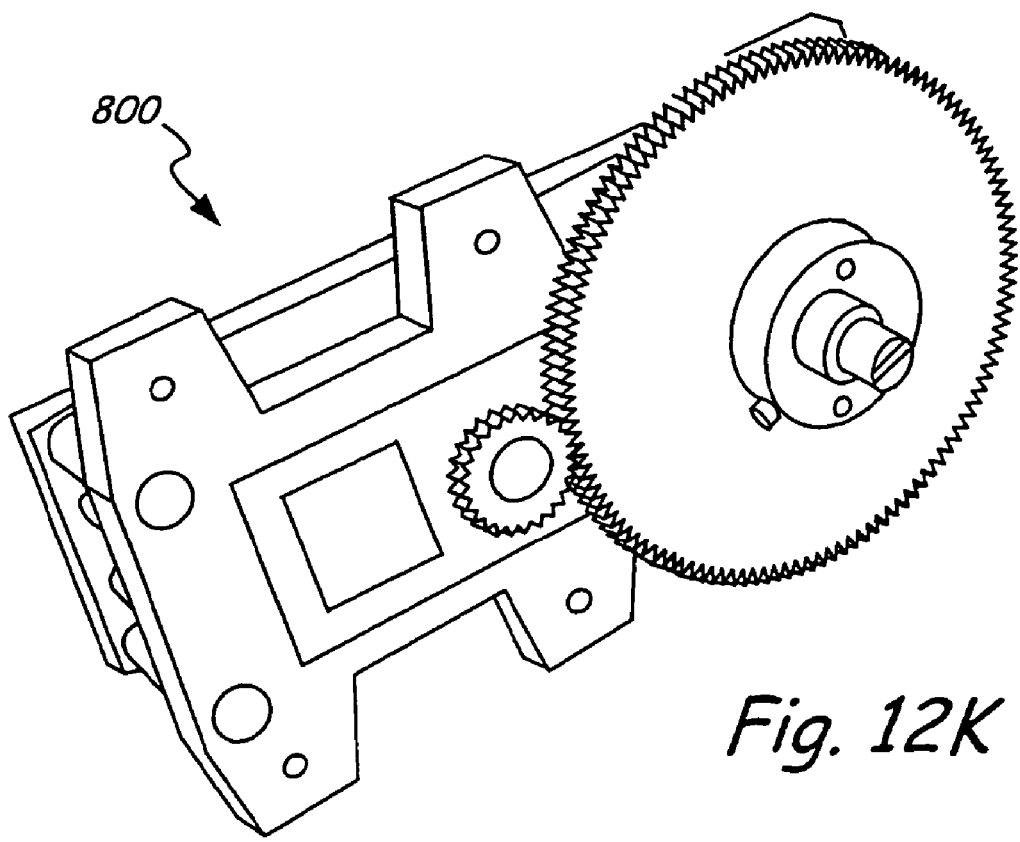

FIG. 12A illustrates a disassembled apparatus 800 including external potentiometer 880, top mounting plate 876, bottom mounting plate 878, brass bushing 882, servo pinion gear 884, large spur gear 886, washer 888, hub 890, hub mounting screws 892, servo mounting screws 894, short standoff posts 896, and standoff mounting screws 898. Modified servo 802 (with mechanical stops removed and potentiometer wires disconnected (illustrated in FIGS. 9A-9K) is not shown. FIG. 12B illustrates bolting external potentiometer 880 to bottom mounting plate 878. Brass bushing 882 is inserted into the hole contained in top mounting plate 876, making sure that the bushing is flush with the surface of the plate (FIG. 12C). Next, with the bushing flange facing upward, the four servo mounting screws 894 are used to mount modified servo 802 to top mounting plate 876 as shown in FIG. 12D. The bolts should not be over-tightened as they need to be loose to properly mesh the gears later. Further, the standoff posts 896 are mounted using the standoff screws 898 and hand-tightened as illustrated in FIG. 12E. FIG. 12F illustrates mounting bottom plate 878 to top plate 876 by pushing the output shaft of potentiometer 880 through the front plate and using standoff screws 898 to secure both plates to the standoff posts 896. Hub 890 is mounted to large spur gear 886 using hub mounting screws 892 (FIG. 12G). Large spur gear 886 is mounted onto the shaft of potentiometer 880 (FIG. 12H). Illustratively in FIG. 12I, the wires 1210 are connected (soldered) to external potentiometer 880 in the same arrangement they were removed in FIG. 9F (i.e. green/white=left, yellow=center, red=right). The servo 802 is pushed up such that the servo gear 850 functionally connects to large spur gear 886, and screws 894 are tightened (FIG. 12J). FIG. 12K illustrates apparatus 800 assembled in accordance with FIGS. 12A-J. It is important to note that apparatus 800 may be used in a variety of different applications. Based on requirements and availability of components, variations may be employed to the configuration of apparatus 800 to achieve enhanced servo performance.

Although the present invention has been described with reference to preferred embodiments, workers skilled in the art will recognize that changes may be made in form and detail without departing from the spirit and scope of the invention.

What is claimed is:

1. A hobby servo motor device having enhanced operational capacity, the device comprising:
    a hobby servo motor having a rotatable servo spline and receiving a coded signal from an input line;
    a rotatable auxiliary shaft displaced from and rotatably coupled to the servo spline;
    an auxiliary potentiometer functionally connected to the auxiliary shaft, the auxiliary potentiometer providing an output signal to the hobby servo motor; and
    wherein an angular position of the auxiliary shaft is proportionally controlled based on the coded signal from the input line and the auxiliary potentiometer output signal.

2. The device of claim 1 wherein the output signal comprises a left signal, a center signal, and a right signal.

3. The device of claim 1 wherein the servo spline has between 23 and 25 teeth.

4. The device of claim 1 wherein the auxiliary shaft is rotatably coupled to the servo spline comprises a servo spline gear coupled to an auxiliary shaft gear.

5. The device of claim 4 wherein the diameter of the servo spline gear is less than the diameter of the auxiliary shaft gear.

6. The device of claim 4 wherein the diameter of the servo spline gear is greater than the diameter of the auxiliary shaft gear.

7. The device of claim 1 and further comprising a frame that mounts the hobby servo motor and the auxiliary shaft.

8. The device of claim 1 and further comprising a mechanical load attached to the auxiliary shaft.

9. A hobby servo motor device having enhanced operational capacity, the device comprising:
    a hobby servo motor having a rotatable servo spline;
    a rotatable auxiliary shaft displaced from and rotatably coupled to the servo spline;
    an auxiliary potentiometer functionally connected to the auxiliary shaft, the auxiliary potentiometer providing an output signal to the hobby servo motor; and
    a mechanical load attached to and actuated by the auxiliary shaft.

10. The device of claim 9 wherein the hobby servo motor receives a coded input signal.

11. The device of claim 10 wherein the auxiliary potentiometer output signal and the coded input signal are utilized to position the mechanical load.

12. The device of claim 9 wherein the hobby servo motor and the auxiliary shaft are mounted in a frame.

13. The device of claim 12 wherein an axis of rotation of the servo spline and an axis of rotation of the auxiliary shaft are parallel.

14. The device of claim 13 wherein the auxiliary shaft is rotatably coupled to the servo spline comprises a servo spline gear coupled to an auxiliary shaft gear.

15. The device of claim 14 wherein the servo spline gear and the auxiliary shaft gear are at least approximately coplanar.

16. The device of claim 15 wherein the servo spline has between 23 and 25 teeth.

17. An apparatus for enhancing the operation performance of a hobby servo motor, the apparatus comprising:
    a frame having an aperture configured to mount a hobby servo motor;
    a rotatable auxiliary shaft mounted in the frame;
    an auxiliary potentiometer functionally connected to the rotatable shaft, the auxiliary potentiometer generating an output signal based on an angular position of the auxiliary shaft.

18. The apparatus of claim 17 and further comprising a mechanical load attached to the auxiliary shaft.

19. The apparatus of claim 17 and further comprising a gear attached to the auxiliary shaft.

20. The apparatus of claim 17 and further comprising a sprocket attached to the auxiliary shaft.

* * * * *